(12) United States Patent
Boehlke et al.

(10) Patent No.: US 12,439,352 B1
(45) Date of Patent: Oct. 7, 2025

(54) SYSTEMS AND METHODS FOR AUDIO TIMING AND SYNCHRONIZATION

(71) Applicant: Datavault AI Inc., Beaverton, OR (US)

(72) Inventors: Kenneth A. Boehlke, Beaverton, OR (US); Harold T. Davis, Beaverton, OR (US)

(73) Assignee: DATAVAULT AI INC., Beaverton, OR (US)

( * ) Notice: Subject to any disclaimer, the term of this patent is extended or adjusted under 35 U.S.C. 154(b) by 248 days.

(21) Appl. No.: 18/222,337

(22) Filed: Jul. 14, 2023

Related U.S. Application Data

(60) Provisional application No. 63/389,184, filed on Jul. 14, 2022.

(51) Int. Cl.
*H04W 56/00* (2009.01)

(52) U.S. Cl.
CPC ................................. *H04W 56/003* (2013.01)

(58) Field of Classification Search
CPC .................................................. H04W 56/003
See application file for complete search history.

(56) References Cited

U.S. PATENT DOCUMENTS

| | | | | | |
|---|---|---|---|---|---|
| 4,038,495 | A | * | 7/1977 | White | G10L 19/06 704/E19.024 |
| 4,554,858 | A | * | 11/1985 | Wachi | G10H 1/125 708/316 |
| 5,309,484 | A | * | 5/1994 | McLane | H04L 7/0029 327/91 |
| 6,066,794 | A | * | 5/2000 | Longo | G10H 5/007 84/645 |
| 6,975,848 | B2 | * | 12/2005 | Rawlins | H04B 1/30 330/303 |
| 7,558,358 | B1 | * | 7/2009 | Melanson | H03L 7/1976 375/376 |
| 9,000,967 | B2 | * | 4/2015 | Pagnanelli | H03M 1/0836 341/143 |
| 9,225,353 | B2 | * | 12/2015 | Pagnanelli | H03M 3/468 |

(Continued)

OTHER PUBLICATIONS

"IEEE Standard for a Precision Clock Synchronization Protocol for Networked Measurement and Control Systems," in IEEE Std 1588-2008 (Revision of IEEE Std 1588-2002), pp. 1-269, Jul. 24, 2008, doi: 10.1109/IEEESTD.2008.4579760.

(Continued)

*Primary Examiner* — Hassan A Phillips
*Assistant Examiner* — Prenell P Jones
(74) *Attorney, Agent, or Firm* — Goodhue, Coleman & Owens, P.C.

(57) ABSTRACT

The present disclosure provides for novel systems and methods of audio transmission that alleviate shortcomings in the art and provide novel mechanisms for robust and scalable audio transmission. In some embodiments, a method is provided for receiving an input time datum, determining a time period from the input time datum to a second time, the second time occurring after the input time datum, determining a value for at least one parameter of an adjustable filter based on the time period, configuring the adjustable filter based on the value of the at least one parameter, determining an output time datum by applying the configured adjustable filter to the input time datum, and outputting the output time datum.

20 Claims, 22 Drawing Sheets

(56) References Cited

U.S. PATENT DOCUMENTS

| | | | |
|---|---|---|---|
| 9,723,580 B2 | 8/2017 | Boehlke | |
| 9,837,990 B1* | 12/2017 | Pagnanelli | H03M 3/468 |
| 10,263,628 B2* | 4/2019 | Pagnanelli | H03L 7/191 |
| 10,602,468 B2 | 3/2020 | Boehlke et al. | |
| 2003/0235262 A1* | 12/2003 | Staszewski | H03L 7/087 |
| | | | 375/376 |
| 2010/0050047 A1* | 2/2010 | Choi | H04L 1/0065 |
| | | | 714/755 |
| 2010/0183163 A1* | 7/2010 | Matsui | H04M 9/082 |
| | | | 381/66 |
| 2015/0171890 A1* | 6/2015 | Pagnanelli | H03M 3/468 |
| | | | 341/143 |
| 2016/0180056 A1* | 6/2016 | Serlie | G16H 50/70 |
| | | | 705/2 |
| 2017/0170838 A1* | 6/2017 | Pagnanelli | H04L 7/005 |
| 2020/0158886 A1* | 5/2020 | Segal | G01S 5/0054 |
| 2023/0090431 A1* | 3/2023 | Banin | H04B 1/04 |
| | | | 375/295 |

OTHER PUBLICATIONS

"IEEE Standard for Local and Metropolitan Area Networks—Timing and Synchronization for Time-Sensitive Applications in Bridged Local Area Networks," in IEEE Std 802.1AS-2011, pp. 1-292, Mar. 30, 2011.

"IEEE Standard for Layer 2 Transport Protocol for Time Sensitive Applications in a Bridged Local Area Network," in IEEE Std 1722-2011, vol. No., pp. 1-65, May 6, 2011, doi: 10.1109/IEEESTD.2011.5764875.

* cited by examiner

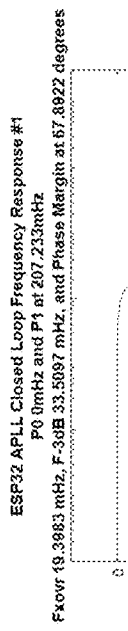
FIG. 17A
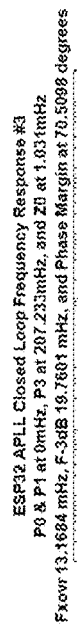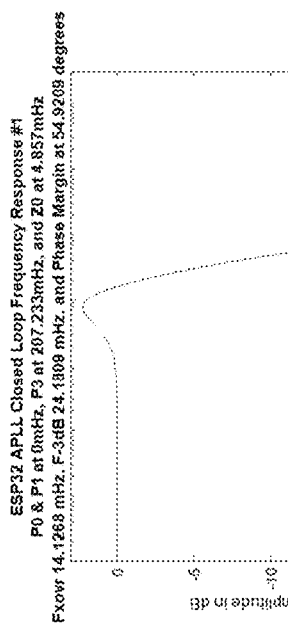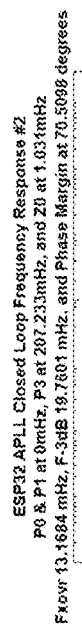
FIG. 17B
FIG. 17C
FIG. 17D

SYSTEMS AND METHODS FOR AUDIO TIMING AND SYNCHRONIZATION

CROSS-REFERENCE TO RELATED APPLICATIONS

This application claims the benefit of U.S. Provisional Patent Application No. 63/389,184, filed Jul. 14, 2022, which is incorporated by reference herein in its entirety.

FIELD OF THE DISCLOSURE

The present disclosure is related generally to the wireless distribution of high-quality audio signals and, in particular to systems and methods of distributing high-bitrate, multi-channel, audio wirelessly while maintaining low latency.

BACKGROUND

Generally, a key element of a positive customer experience with wireless audio systems is a robust-low latency wireless link. Low latency audio is desirable for enabling good audio to video synchronization (or Lip Sync). For example, low latency audio systems allow for compatibility with abroad range of televisions. A low latency audio system will work with both low and high latency televisions as the transmitted audio can always be delayed to match the video. On the other hand, an audio system with high latency may be incompatible with low latency televisions because the audio cannot be advanced to match the video. Low latency requires quick access to the radio medium as well as low computational times.

While audio and video equipment has historically been connected by analog or digital point-to-point, one-way connections, an increasing portion of multimedia content is distributed over networks. For example, video and uncompressed audio may be streamed from an audio/video source in a media room or closet to a display and multiple speakers of a surround sound system in a remote room or rooms in a residence. Due to increased cost and complexity, retrofitting finished structures with cabling, in many cases data, including video and audio data, is transmitted from a source to a display, speakers or other output devices over a network that includes a wireless communication link(s) utilizing low cost radio technologies such as frequency modulation and spread spectrum modulation to transport packetized digital data.

High quality audio, whether or not combined with video, benefits from synchronization of outputs and minimization of system latency. That is, synchronization of the various outputs and minimization of system latency can be important to high quality audio/video systems. For example, source-to-output delay or latency ("lip-sync") can be important in audio/video systems, such as home theater systems, where a slight difference (e.g., on the order of 50 milliseconds (ms)) between display of a video sequence and the output of the corresponding audio is noticeable. On the other hand, the human ear is even more sensitive to phase delay or channel-to-channel latency between the corresponding outputs of the different channels of multi-channel audio. For example, channel-to channel latency greater than 1 microsecond ($\mu s$) may result in the perception of disjointed or blurry audio.

Generally, in a digital network, such as an audio/video system, a source of digital data transmits a stream of data packets to the network's endpoints where the data is presented. In some implementations, a pair of clocks at each node of the network controls the time at which a particular datum is presented and the rate at which data is processed, for example, an analog signal is digitized or digital data is converted to an analog signal for presentation. The actual or real time that an activity is to occur, such as presentation of a video datum, is determined by "wall time," the output of a "wall clock" at the node. In some implementations, a sample or media clock controls the rate at which data is processed, for example, the rate at which blocks of digital audio data introduced to a digital to analog converter.

Audio video bridging (AVB) is the common name of a set of technical standards developed by the Institute of Electrical and Electronics Engineers (IEEE) providing specifications directed to time-synchronized, low latency, streaming services over networks. The Precision Time Protocol (PTP) specified by "IEEE Standard for a Precision Clock Synchronization Protocol for Networked Measurement and Control Systems," IEEE Std. 1588-2008 and adopted in IEEE 802.1AS-2011—"IEEE Standard for Local and Metropolitan Area Networks—Timing and Synchronization for Time-Sensitive Applications in Bridged Local Area Networks" describes a system enabling distributed wall clocks to be synchronized within 1 $\mu s$ over seven network hops.

In an AVB network, each network endpoint (e.g., a network node capable of transmitting and/or receiving a data stream) can include two clocks-a "wall" clock and a "media" or "sample" clock. In some embodiments, wall time output by the wall clock can determine the real or actual time of an event's occurrence and/or the real or actual time difference between the initiation of a task and the task's completion. In some embodiments, a sample clock can be an alternating signal which can control the rate at which data is passed to a media processing device for processing. For example, in an embodiment, in a digital audio system, sample clocks can govern the rate at which an analog signal is sampled and the rate at which digital samples are to be passed to a digital-to-analog converter (DAC) controlling the emission of sound by a speaker.

The master clock (or primary clock, used interchangeably) to which the remaining distributed clocks, the slave clocks (or secondary clocks, used interchangeably), are to be synchronized can be selected either by a "best master clock" algorithm or manually. Periodically, the device comprising the master clock (the master or primary device) and the device(s) comprising the slave clock(s) (the slave or secondary device(s)) exchange messages which include timestamps indicating the master clock's "wall time" when the respective message was either transmitted or received by the master device. The slave device notes the local wall times when the respective messages were received or transmitted by it and calculates the offset of the slave clock relative to the master clock and the network delay (the time required for the messages to traverse the network from the master device to the slave device). With repeated measurements, the frequency drift of the slave clock relative to the master clock can also be determined. Said measurements enable the slave clock to be synchronized with the master clock by adjusting the slave clock's wall time for the offset and the network delay; and adjusting the slave clock's frequency for any frequency drift relative to the master clock.

In some implementations, AVB can synchronize the outputs of the network's listeners by delivering data to each endpoint's media interface, for example, a controller for a video display or the digital-to-analog converters (DAC) of plural wireless speakers, at the synchronized wall times specified in the timestamps and at a rate determined by synchronic sample clocks. While the sample clocks regulating the rendering on each medium and the wall clocks controlling presentation time can be synchronized, in a wireless network some packets can be lost. In that case each receiver can receive a respective aliased subsample of the data packets and accompanying timestamps conveyed in the data stream. Thus, loses during packet transfer, clock jitter and resulting sample clock variation may make it difficult to maintain less than 50 μs channel-to-channel latency as may be used for high quality, multi-channel, surround sound audio. In some implementations, synchronicity in presenting related content at plural network endpoints can be promoted by introducing a frequency filtering function in the clock path at a sample clock recoverer, enabling recovery of a bandlimited sample clock which is, in turn, copied to other listeners requiring the same sample clock, for example, a plurality of surround speaker units of an audio/video system.

In some implementations, PTP can synchronize wall clocks of an extensive network or even a plurality of networks, but the accuracy of PTP can be influenced by the loading and exposure to interference of the wireless communication link(s). An alternative to PTP for synchronizing the wall time at a plurality of devices of a wireless network is the Time Synchronization Function (TSF) specified in IEEE 802.11, "IEEE Standard for Information Technology—Telecommunications and Information Exchange Between Systems Local and Metropolitan Area Networks." Every 802.11 compliant device in a network (known as a basic service set (BSS)) includes a TSF counter. Periodically, during a beacon interval, devices of the BSS transmit a beacon frame containing a timestamp indicating the local wall time at the transmitting device and other control information. A receiving node (e.g., a slave or secondary device) receiving the beacon frame synchronizes its local time by accepting the timing information in the beacon frame and setting its TSF counter to the value of the received timestamp if the timestamp indicates a wall time different than the node's TSF counter.

However, neither PTP nor TSF provide for synchronization of the media or sample clocks which control the rate at which application data is processed by the processing elements of the network's devices. The Audio Video Bridging Transport Protocol (AVBTP) of "IEEE 1722-2011: Layer 2 Transport Protocol for Time Sensitive Applications in a Bridged Local Area Network" provides that each network endpoint (e.g., a device that receives or transmits data) is to recover the sample clock from data in the packetized data stream transmitted by the data source. Each data packet can comprise a plurality of application data samples, for example, audio data samples, and a time stamp indicating the wall time at which presentation of the application data in the packet is to be initiated. At each network endpoint, a sample clock can be generated which oscillates at a frequency that enables the plurality of application data samples in a data packet to be presented for processing within the time interval represented by successive timestamps.

While PTP, TSF and AVBTP provide means for synchronizing distributed clocks, not all packets transmitted by a network data source, particularly packets transmitted wirelessly, reach their destinations. As packets are lost, each network endpoint, for example, the speaker units of a surround sound audio system, receive a respective aliased subsample of the timestamps and over time the clocks of the respective network endpoints will not track.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 17A illustrates non-limiting embodiments of experimental results of an APLL closed loop frequency response according to some embodiments.

FIG. 17B illustrates non-limiting embodiments of experimental results of an APLL closed loop frequency response according to some embodiments.

FIG. 17C illustrates non-limiting embodiments of experimental results of an APLL closed loop frequency response according to some embodiments.

FIG. 17D illustrates non-limiting embodiments of experimental results of an APLL closed loop frequency response according to some embodiments.

DETAILED DESCRIPTION

Figure 1:
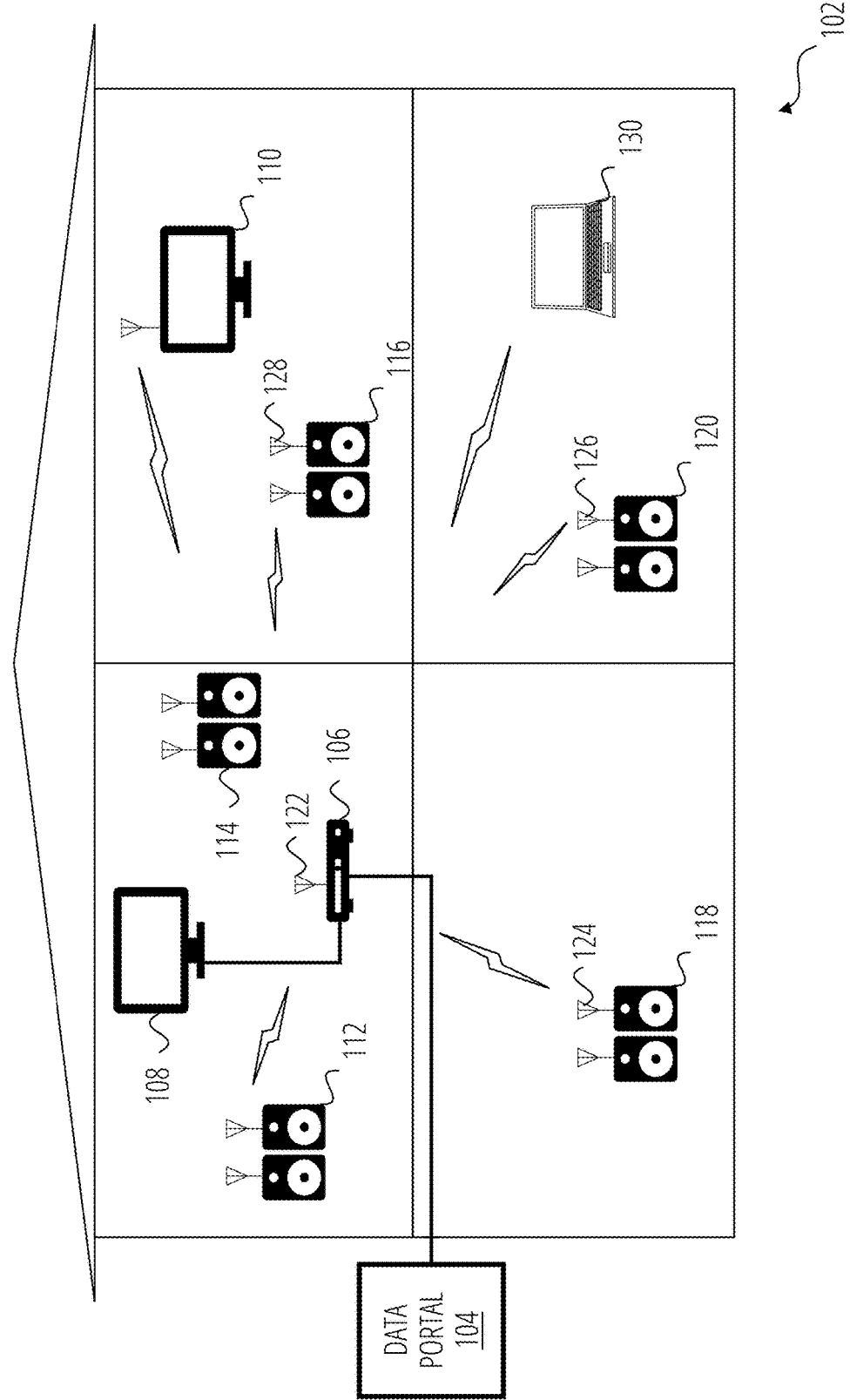
FIG. 1 is a block diagram illustrating non-limiting components of a general environment according to some embodiments.

The present disclosure provides for novel systems and methods of audio transmission that alleviate shortcomings in the art, and provide novel mechanisms for robust and scalable audio transmission. In some aspects, the present disclosure relates to wireless data networks and, more particularly, to systems and methods for synchronizing outputs at multiple endpoints in a network which includes a wireless communication link.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

The detailed description provided herein is not intended as an extensive or detailed discussion of known concepts, and as such, details that are known generally to those of ordinary skill in the relevant art may have been omitted or may be handled in summary fashion.

In some embodiments, a method of audio transmission can transmit speaker and microphone data between speaker-transmitter and a speaker-receiver via at least one of a forward link and a reverse link. In some embodiments, a method of audio transmission can transmit auxiliary data via at least one of the forward link and the reverse link. In some embodiments, the auxiliary data can include forward and reverse control and status data sent over the forward link and the reverse link to maintain the link's operation and provide a control channel for different applications. In some embodiments, a method of audio transmission can transmit data via at least one of the forward link and the reverse link to maintain audio timing synchronization.

In some aspects, the techniques described herein relate to a method comprising receiving an input timing datum and determining a time period from the input time datum to a second time, the second time occurring after the input timing datum. In some aspects, the method further comprises determining a value for at least one parameter of an adjustable filter based on the time period and configuring the adjustable filter based on the value of the at least one parameter. In some aspects, the method also comprises determining an output timing datum by applying the configured adjustable filter to the input timing datum and outputting the output timing datum.

In some aspects, the at least one parameters of the adjustable filter can be selected from the group comprising coefficients and loads or presets for internal accumulators or integrators of the adjustable filter.

In some aspects, the configured adjustable filter can be a critically damped Type 1 loop filter where the value of the at least one parameters corresponds to a previously settled loop filter. In some aspects, the configured adjustable filter can be a critically damped Type 2 loop filter. In some aspects, the configured adjustable filter can be an over-damped Type 2 loop filter.

In some aspects, the timing period can be a first timing period and the configured adjustable filter can be a critically damped Type 1 loop filter where the value of the at least one parameter corresponds to a previously settled loop filter.

In some aspects, the method can further comprise determining a second time period from the input time datum to a third time, the third time occurring after the second time, determining a second value for the at least one parameter of the adjustable filter based on the second time period, and reconfiguring the adjustable filter based on the second value of the at least one parameter, wherein the reconfigured adjustable filter is a critically damped Type 2 loop filter.

In some aspects, the method can further comprise determining a third time period from the input time datum to a fourth time, the fourth time occurring after the third time, determining a third value for the at least one parameter of the adjustable filter based on the third time period, and reconfiguring the adjustable filter based on the third value of the at least one parameter, wherein the reconfigured adjustable filter is an over-damped Type 2 loop filter.

In some aspects, the adjustable filter can be a first adjustable filter and where determining the output timing datum further comprises applying a second adjustable filter in a feedback path between the input and output of the first adjustable filter. In some aspects, the method can further comprise determining the value for the at least one parameter based on amplitude limits of the difference between an input and an output of the adjustable filter.

In some aspects, the techniques described herein relate to a device comprising a processor configured to receive an input timing datum and determine a time period from the input time datum to a second time, the second time occurring after the input timing datum. In some aspects, the processor can be further configured to determine a value for at least one parameter of an adjustable filter based on the time period and configure the adjustable filter based on the value of the at least one parameter. In some aspects, the processor can also be configured to determine an output timing datum by applying the configured adjustable filter to the input timing datum and output the output timing datum.

Certain embodiments will now be described in greater detail with reference to the figures.

Referring now to FIG. 1, FIG. 1 illustrates non-limiting components of a general environment 100 according to some embodiments. FIG. 1 shows components of a general environment in which the systems and methods discussed herein may be practiced. Not all the components may be required to practice the disclosure, and variations in the arrangement and type of the components may be made without departing from the spirit or scope of the disclosure.

According to some embodiments, in a building or residence 102, data, including video and audio data, can be retrieved from a storage medium, such as a DVD by a DVD player or from a data portal 104 connected to, for example, a wide area fiber optic network or a satellite receiver, and distributed throughout the residence. For example, in some embodiments, digital video and/or multi-channel audio can be distributed from a source 106 (e.g., DVD player, gaming console, computer, mobile device, and the like) in room for presentation (e.g., output, playback, display) by displays 108 and 110 and/or surround sound or stereo speaker units 112-120 in different rooms of residence 102. In some embodiments, at least part of the distribution network can comprise one or more radio transmitters 122 which can be part of a source 106 and one or more radio receivers 124-126 which can be incorporated in the networked devices such as a computer 130, a video display 110, or the speakers 112-120 of one or more a stereo or surround sound systems.

Figure 2:
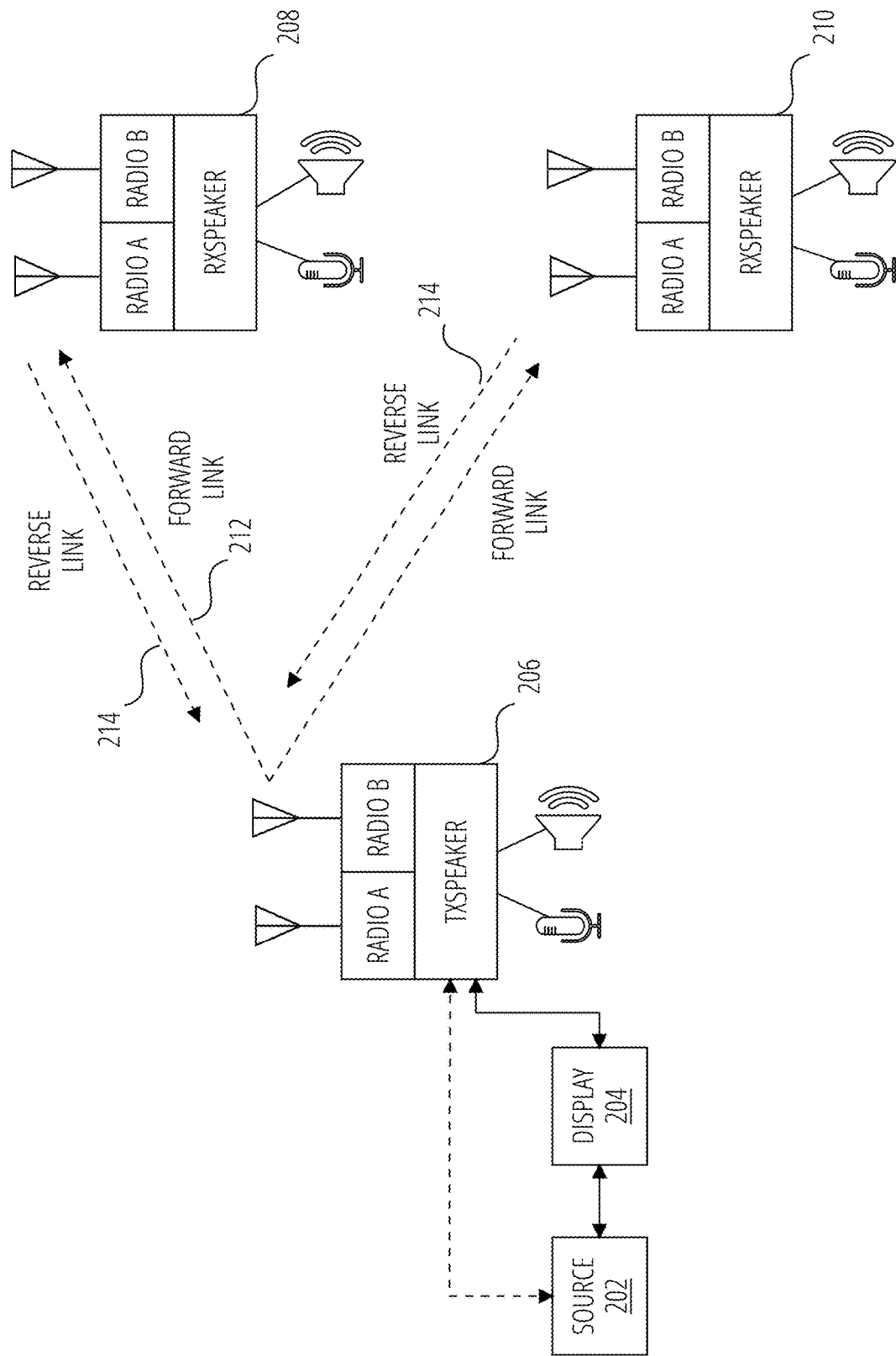
FIG. 2 is a block diagram illustrating non-limiting components of an exemplary system according to some embodiments.

FIG. 2 is a block diagram illustrating non-limiting components of an exemplary system 200 according to some embodiments. FIG. 2 shows components of a general environment in which the systems and methods discussed herein may be practiced. Not all the components may be required to practice the disclosure, and variations in the arrangement and type of the components may be made without departing from the spirit or scope of the disclosure. In some embodiments, different components of system 200 may be combined into a single device.

As shown, system 200 of FIG. 2 may include a data source 202, display 204, a transmitter-speaker (TxSpeaker) 206, and one or more receiver-speakers (e.g., RxSpeakers 208 and 210). In some embodiments, a TxSpeaker can be referred to as a talker according to some embodiments described herein. In some embodiments, a RxSpeaker can be referred to as a listener according to some embodiments described herein. In some embodiments, RxSpeakers 208-210 may be referred to as wireless satellite units. In some embodiments, TxSpeaker 206 and RxSpeakers 208-210 may include one or more microphones and one or more speakers.

In some embodiments, source 202 may be a source of digital audio and/or video. In some embodiments, source 202 is the internet. In some embodiments, source 202 may transmit an audio/video stream including a plurality of packets. In some embodiments, source 202 may be a media player, a gaming console, a mobile device, a networking device, or any other device capable of reproducing and/or transmitting media. In some embodiments, an audio/video stream may be provided to a display 204 for displaying (e.g., a television, a projector, a display monitor) visual media associated with the audio/video stream.

For example, in an embodiment, where the source 202 is a gaming console, source 202 may transmit audio and/or graphics corresponding to gameplay to the display 204. In turn, display 204 may display the graphics. In some embodiments, an audio component of a media stream may be transmitted directly from the source 202 to the TxSpeaker 206. In some embodiments, the media steam may be transmitted from the source 202 to the display 204 and, in turn, the display 204 may transmit audio information corresponding to the media stream to the TxSpeaker 206.

According to some embodiments, TxSpeaker 206 may process the audio information and transmit the processed or transformed audio information to the one or more RxSpeakers (e.g., RxSpeaker 208 and RxSpeaker 210).

According to some embodiments, system 200 may be a multi-radio architecture. In some embodiments, data transmitters and receivers of system 200 may utilize one or more radio chains to communicate. For example, in the non-limiting embodiment of FIG. 2, TxSpeaker 206 and RxSpeakers 208 and 210 have two radio chains Radio A and Radio B. In some embodiments, TxSpeaker 206 and RxSpeakers 208 and 210 may have one or more radio chains.

In an embodiment, TxSpeaker 206 and RxSpeakers 208 and 210 may communicate through independent radio chains. For example, in some embodiments, TxSpeaker 206 may communicate with RxSpeakers 208 and 210 through Radio A, Radio B, or both. It will be noted that, in some embodiments, any radio chain of TxSpeaker 206 and RxSpeakers 208 and 210 may communicate with any other radio chain. For example, in some embodiments, TxSpeaker 206 may use Radio A to communicate with Radio B of RxSpeaker 208 while communicating with Radio A of RxSpeaker 210. In some embodiments, any TxSpeaker or RxSpeaker may communicate with any other of TxSpeaker or RxSpeaker using any type of digital communications (including wired and wireless) known or to be known without departing from the scope of the present disclosure.

According to some embodiments, Radio A and Radio B may use Channel A and Channel B, respectively. In some embodiments, Channel A and Channel B may have a channel frequency. In some embodiments, Channel A and Channel B may be separated in channel frequency or band of operation (e.g., Frequency Diversity). In some embodiments, Channel A and Channel B may in the same band but have different bandwidths (e.g., 20/40/80/160 MHz bandwidth in 802.11ac). In some embodiments, Channel A and Channel B may be separated in time (e.g., Temporal Diversity). That is, in some embodiments, data packets may be sent over Channel A and/or Channel B at a different time slots to overcome a burst interference that has interfered with a primary time slot.

According to some embodiments, Channel A and Channel B may be separated in a Modulation Coding Scheme (e.g., Coding Diversity). That is, in some embodiments, data packets may be sent using different physical layer rates of a f a wireless network protocol. For example, in some embodiment, a physical layer rate may be 6 Mbps using Binary Phase-Shift Keying (BPSK) and a coding rate of 1/2 as disclosed in 802.11a. In some embodiments, a physical layer rate may be 54 Mbps using 64-QAM scheme and a coding rate of 3/4 as disclosed in 802.11a.

According to some embodiments, Channel A and Channel B may have different communication methods (e.g., Broadcast/Multicast v. Unicast). In some embodiments, where the channel communication method is Broadcast/Multicast, data packets may be transmitted to multiple receivers at the same time. In some embodiments, where the channel communication method is unicast, a transmitter may transmit data packets to individual receivers independently. It will be noted that as used herein, any of TxSpeaker 206, RxSpeaker 208, and RxSpeaker 210 may act be a receiver, a transmitter, or both.

According to some embodiments, Channel A and Channel B may have different retransmission methods (e.g., User Datagram Protocol (UDP), Transmission Control Protocol/Internet Protocol (TCP/IP)). In some embodiments, where the retransmission method is UDP, data packets may be sent without acknowledgment. In some embodiments, where the retransmission method is TCP/IP, acknowledgment of packet loss and retransmission of lost packets is supported.

According to some embodiments, Channel A and Channel B may use different radio Physical Layers (e.g., Orthogonal Frequency Domain Multiplexing (OFDM) as disclosed in 802.11a/n/ac, Frequency Hopping Spread Spectrum (FHSS) as disclosed by the Bluetooth standard, and Code Division Multiple Access (CDMA) as disclosed in 802.11b). In some embodiments, different Physical Layers can cover the same frequency band but use different medium access methods and spectral reuse properties. For example, in some embodiments, 802.11g and Bluetooth both share the 2.4 GHz Band, however, 802.11g may move from one 20 MHz Channel to another while Bluetooth dynamically may hop over an entire 80 MHz band in one packet period.

According to some embodiments, TxSpeaker 206 may transmit data containing source audio information (e.g., received from source 202) to RxSpeakers 208-210 via one or more forward links 212. In some embodiments, the forward link 212 between TxSpeaker 206 and RxSpeaker 208 may be independent of the forward link 212 between TxSpeaker 206 and RxSpeaker 210 or any other RxSpeaker or satellite unit.

In some embodiments, RxSpeakers 208-210 may transmit microphone audio information to the TxSpeaker 206 via one or more reverse links 214. In some embodiments, the reverse link 214 between RxSpeaker 208 and TxSpeaker 206 may be independent from the reverse link 214 between RxSpeaker 210 (or any other satellite unit or device) and the TxSpeaker 206.

In some embodiments, beside speaker and microphone data, TxSpeaker 206 and RxSpeakers 208-210 may exchange forward and reverse control and status data to maintain a link's operation and provide a control channel for customer's applications. In some embodiments, TxSpeaker 206 and RxSpeakers 208-210 may exchange control and status data using forward link 212 and/or reverse link 214.

In some embodiments, TxSpeaker 206 and/or RxSpeakers 208-210 may include or be able to provide auxiliary functions. In some embodiments, an auxiliary function may be microphone sampling and processing. In those embodiments, TxSpeaker 206 and/or RxSpeakers 208-210 may include specialized hardware (e.g., ASICs) and software (e.g., Applications) in order to capture audio using a microphone and process the audio data.

In some embodiments, an auxiliary function may be a system and speaker configuration and control. In those embodiments, TxSpeaker 206 and RxSpeakers 208-210 may exchange control and status data in order to effect a change in the settings or the performance of at least one a source 202, display 204, TxSpeaker 206, RxSpeakers 208-210, or a combination thereof. In some embodiments, an auxiliary function may be a user interface. In some embodiments, an auxiliary function may be speaker and room calibration and equalization, and the like.

In some embodiments, TxSpeaker 206 and/or more of the RxSpeakers 208-210 may exchange auxiliary function data over a forward link 212. In some embodiments, TxSpeaker 206 and or more of the RxSpeakers 208-210 may exchange auxiliary function data over a reverse link 214. As will be noted, any of the TxSpeaker 206 and the RxSpeakers 208-210 may transmit or receive auxiliary function data through any of the forward link 212 and reverse link 214 with any of the other of the TxSpeaker 206 and the RxSpeakers 208-210.

In some embodiments, each link (e.g., forward link 212 and reverse link 214) may have a separate throughput and delay requirement to meet the user's requirements for audio fidelity and transmission delay. In some embodiments, timing is tracked using a Timing Synchronization Function (TSF).

In some embodiments, TxSpeaker 206 can transmit via the forward link 212 using unicast, multicast, or groupcast packets to send data to each RxSpeaker (e.g., RxSpeakers 208-210) individually or TxSpeaker 206 may send data to all RxSpeakers (RxSpeaker 208-RxSpeaker 210) at once. In some embodiments, packets transmitted over reverse link 214 may be unicast, multicast, or groupcast packets.

In some embodiments, TxSpeaker 206 may act as a Wireless Access Point and RxSpeakers 208-210 may act as a client in a wireless network architecture (e.g., WiFi). In some embodiments, a mesh network architecture may allow RxSpeakers 208-210 to send all of the same packet types that a TxSpeaker 206 can. In some embodiments, some devices (e.g., TxSpeaker 206, RxSpeakers 208-210) may allow the use of Action Management Frames to send packets between all members of a network.

Figure 3A:
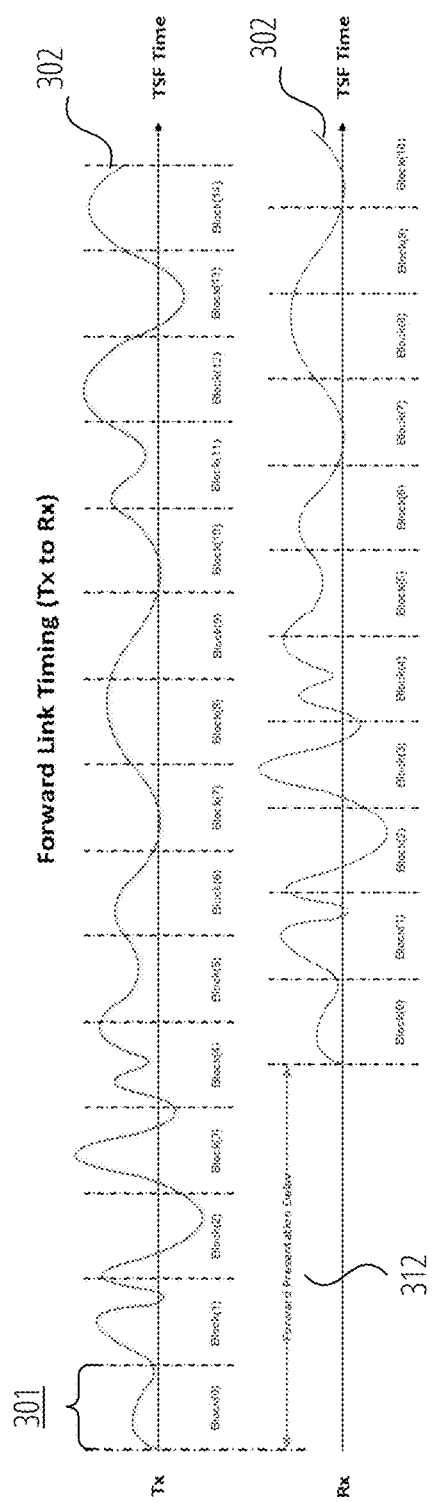
FIG. 3A illustrates a timing diagram of data transmission on a forward link according to some embodiments.
Figure 3B:
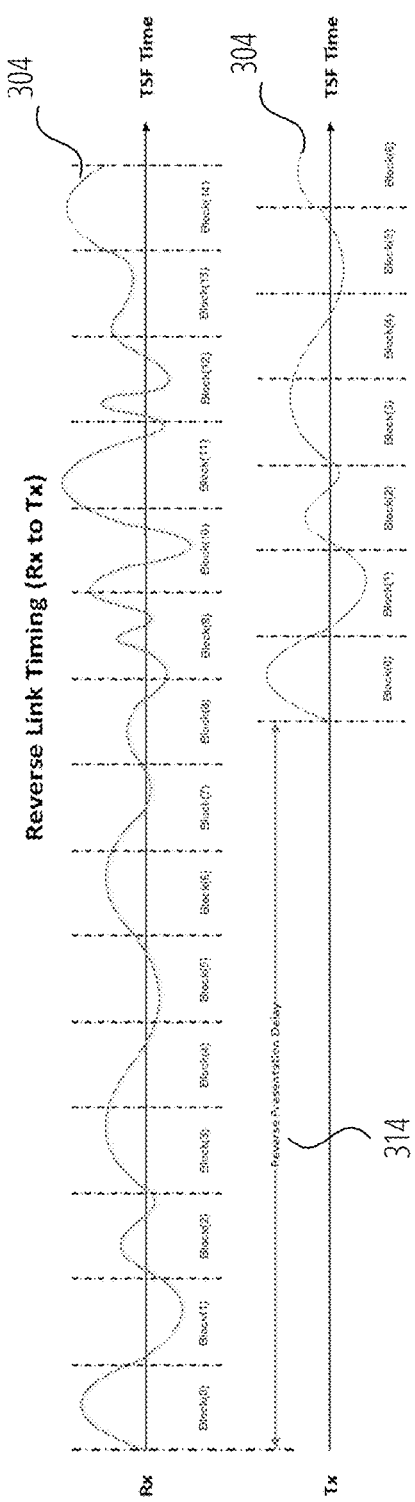
FIG. 3B illustrates a timing diagram of data transmission on a reverse link according to some embodiments.
Figure 3C:
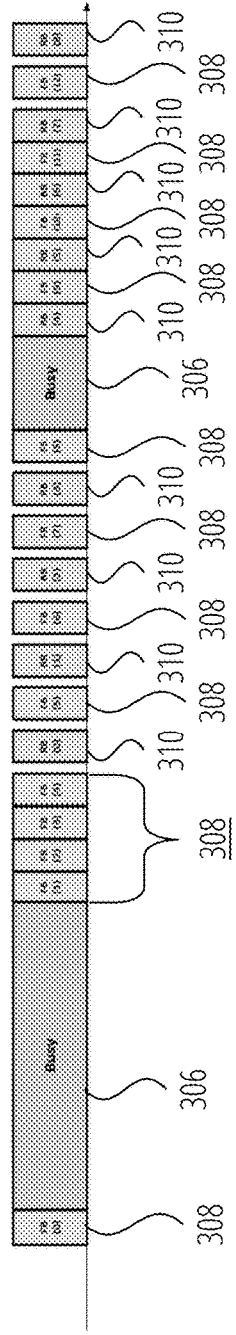
FIG. 3C illustrates a timing diagram of data packets according to some embodiments.

Turning now to FIG. 3A-FIG. 3C, FIG. 3A illustrates a timing diagram of data transmission on a forward link 302 according to some embodiments. FIG. 3B illustrates a timing diagram of data transmission on a reverse link 304 according to some embodiments. FIG. 3C illustrates a timing diagram of data packets according to some embodiments.

Figure 20:
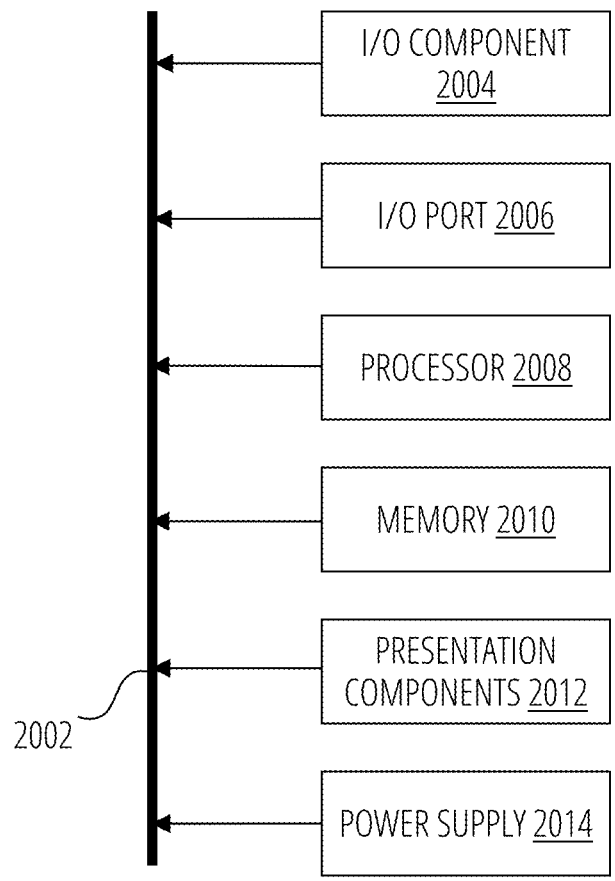
FIG. 20 is a schematic diagram illustrating an example embodiment of a device according to some embodiments.

According to some embodiments, each block 301 of data (e.g., block(0) through block(14)) may be tagged with a Presentation Time stamp, which is the TSF time that the first sample in the block should be played by a device (e.g., TxSpeaker 206 and RxSpeakers 208-210 as discussed in relation to FIG. 2 or a device 2000 discussed in relation to FIG. 20). In some embodiments, a block 301 of data may be made up of several packets that are Network Coded together. In some embodiments, forward and reverse links (e.g., forward link 302, reverse link 304) can have a different presentation delay parameter (e.g., forward presentation delay 312, reverse presentation delay 314), where the presentation delay is the difference between the time the audio was sampled or acquired and what TSF time it will be played or rendered in the future.

According to some embodiments, the forward link 302 and reverse link 304 may share a Wireless Medium with other wireless networks (e.g., WiFi). In some embodiments, the forward link 302 and reverse link 304 may correspond to forward link 212 and reverse link 214, respectively, discussed in relation to FIG. 2. In some embodiments, forward link 302 may include forward link packets 308 illustrated in FIG. 3C. In some embodiments, reverse link 304 may include reverse link packets 310 illustrated in FIG. 3C. In some embodiments, packets from other wireless networks may be represented by packets in busy slots 306 in FIG. 3C.

In some embodiments, the forward link 302 can have a forward presentation delay 312. In some embodiments, the reverse link 304 can have a reverse presentation delay 314. As will be noted, the presentation delay margins (e.g., forward presentation delay 312 and reverse presentation delay 314) shown in FIG. 3A may be the Figure of Merit used to adjust audio links. In some embodiments, a presentation margin is the residual time left from the arrival of the packets at the receiver (e.g., TxSpeaker 206 and RxSpeakers 208-210) to when they must be processed and played by the receiver. In some embodiments, a negative presentation delay margin may indicate that the packets are received at the receiver too late to process and cannot be played. In some embodiments, an error concealment process generates similar audio for these late blocks. In some embodiments, a positive presentation time (PT) delay margin may indicate a measure of how robust the link timing is and how free the wireless medium is.

According to some embodiments, the information contained in a reverse link (e.g., RxSpeaker to TxSpeaker) can be modified such that the reverse presentation delay 314 is replaced by audio capture parameters. According to some embodiments, audio capture parameters can describe the state of an RxSpeaker at a time when microphone data was captured at that RxSpeaker. In some embodiments, the reverse link can parse captured microphone data from the background audio content being presented at each RxSpeaker.

According to some embodiments, a transmitter or receiver can filter unwanted audio content from a captured microphone signal of interest using the audio capture parameters. In some embodiments, the audio capture parameters can include: an Estimated TSF Time (e.g., time at which the microphone data was captured at the RxSpeaker), a state of an Error Concealment Block, and a state of a Presentation Time (PT) Phase Detector. The audio capture parameters are discussed in further detail with respect to FIG. 12.

Figure 4:
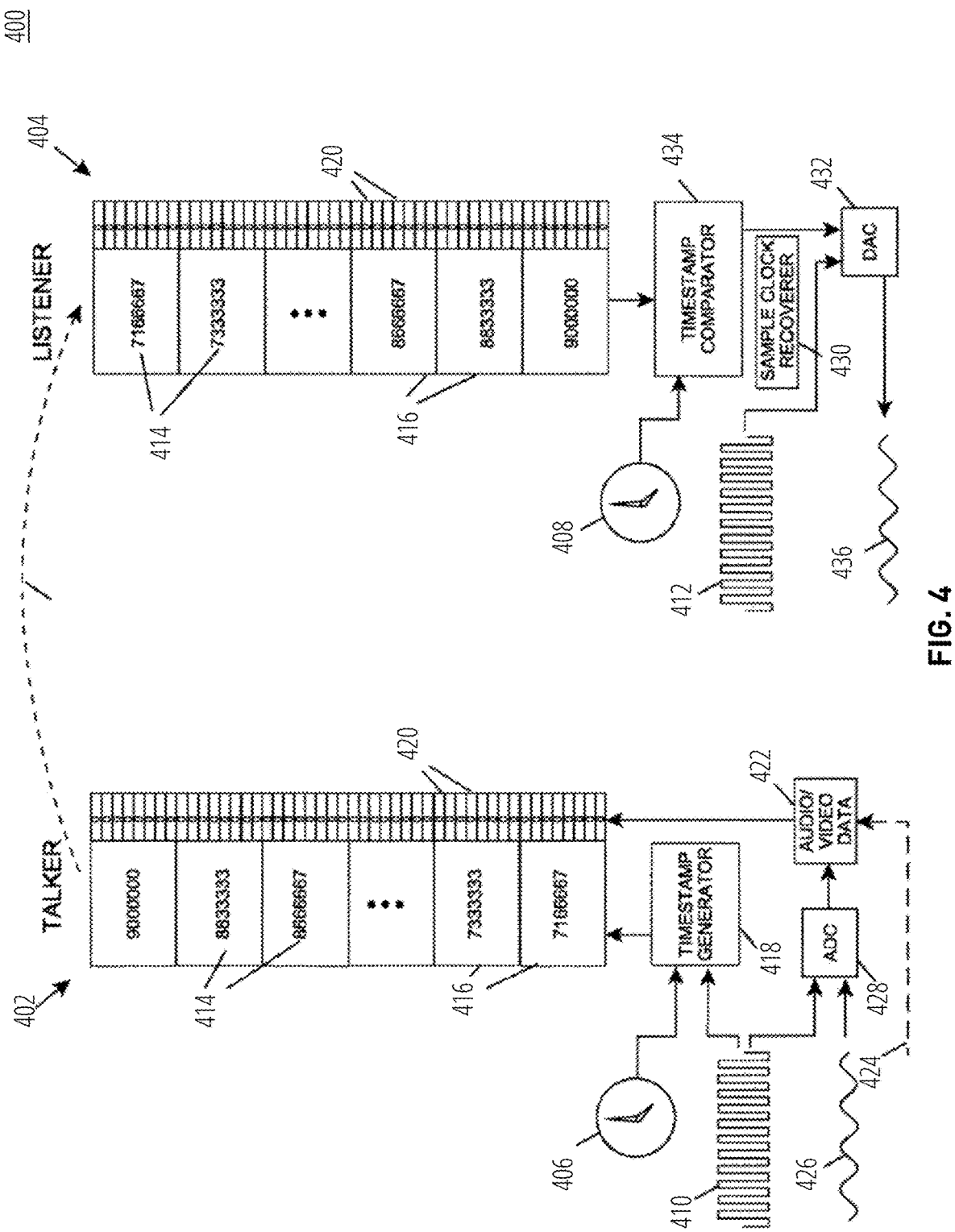
FIG. 4 is a graphic representation of a method of assembling and presenting application data included in data packets having AVBTP timestamps according to some embodiments.

Referring now to FIG. 4, FIG. 4 is a graphic representation of a method of assembling and presenting application data included in data packets having AVBTP timestamps according to some embodiments.

According to an embodiment, in an audio video bridging (AVB) network 400, each network endpoint, a network node capable of transmitting and/or receiving a data stream, can include two clocks: a "wall" clock 406, 408 and a "media" or "sample" clock 410, 412. In some embodiments, wall time output by the wall clocks 406, 408 can determine the real or actual time of an event's occurrence and/or the real or actual time difference between the initiation of a task and the task's completion. In some embodiments, the sample clock 410, 412 can be an alternating signal which controls the rate at which data is passed to a media processing device for processing. For example, in some embodiments, in a digital audio system, sample clocks can govern the rate at which an analog signal is sampled and the rate at which digital samples are to be passed to a digital-to-analog converter (DAC) controlling the emission of sound by a speaker.

In some embodiments, a media source or talker 402 (e.g., a TxSpeaker 206 as described in relation to FIG. 2) can embed presentation timestamps 414 in certain data packets 416 transmitted by the respective source. In some embodiments, a timestamp generator 418, controlled by the talker's sample clock 410 for the particular medium being processed, can insert a timestamp 414 into a header of a data packet 416 with the wall time from the talker's wall clock 406. In some embodiments, the talker's wall clock can be adjusted by a latency normalization value. In some embodiments, the timestamp can indicate the wall time at which presentation of application data included in the data packet may be initiated. In some embodiments, blocks 420 of application data 422, such as Inter-IC Sound (I2S) digital audio data can be included in each data packet 416. In some embodiments, the blocks 420 of application data 422 can be obtained from a digital data source 424 or converted from an analog signal 426 by an analog-to-digital converter (ADC) 428 at a rate determined by the sample wall clock 406. In some embodiments, a data block count, included in the header of each data packet, can specify the number of application data blocks 420 to be presented in the interval represented by the difference between successive presentation timestamps. At the listener 404, the sample wall clock 406 is recovered by a sample clock recoverer 430. In some embodiments, the digital audio data can be converted to an analog signal 436 by digital-to-analog converter (DAC) 432.

Figure 5:
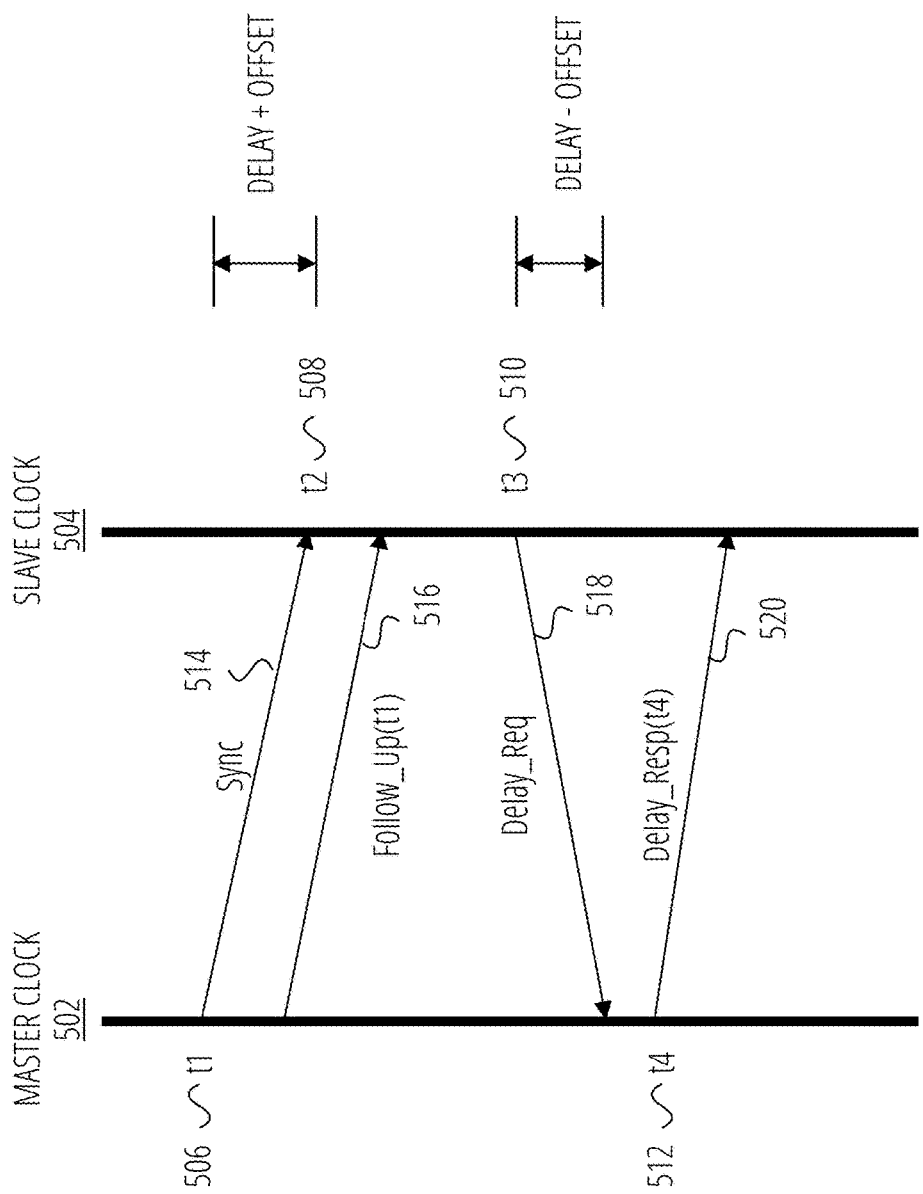
FIG. 5 illustrates a method for synchronizing clocks among devices in a network according to some embodiments.

Referring now to FIG. 5, FIG. 5 illustrates a method for synchronizing clocks among devices in a network according to some embodiments. FIG. 5 illustrates a Precision Time Protocol (PTP) of "IEEE Standard for a Precision Clock Synchronization Protocol for Networked Measurement and Control Systems," IEEE Std. 1588-2008. In some embodiments, the PTP provides, inter alia, a method 500 of synchronizing a wall time at "slave" clock 504 distributed among the nodes of a network to a wall time of the network's "master" clock 502.

According to some embodiments, when operation of a network is initiated, a master clock 502 can be selected either manually or by a "best master clock" algorithm. Afterward, messages can be periodically exchanged between a device comprising the master clock 502 (e.g., the master or primary device) and the network devices comprising the slave clocks 504 (e.g., the slave or secondary devices) enabling determination of an offset, the time by which a slave clock leads or lags the master clock, and the network delay, the time required for data packets to traverse the network.

In some embodiments, at defined intervals (e.g., two second intervals) the master device can multicast a Sync message 514 to the other network devices. In some embodiments, the precise master clock 502 wall time of the sync message's transmission, t1 506, can be determined and included as a timestamp in either the Sync message 514 or in a Follow-Up message 516. In some embodiments, the slave device can determine the local wall time, t2 508, at which the device received the Sync message 514.

In some embodiments, a Delay_Req message 518 can then be sent by the slave device to the master device at time t3 510. In some embodiments, the master clock's time of receipt, t4 512, of the Delay_Req message 518 can be determined. And, in some embodiments, the master device can respond with a Delay_Resp message 520 which includes a timestamp indicating t4 512. In some embodiments, the slave device can then determine the network delay and the slave clock's offset from the four times, t1 506, t2 508, t3 510, and t4 512:

$$\text{Delay} + \text{Offset} = t2-t1 \quad (1)$$
$$\text{Delay} - \text{Offset} = t4-t3 \quad (2)$$
$$\text{Delay} = ((t2-t1) + (t4-t3))/2 \quad (3)$$
$$\text{Offset} = ((t2-t1) - (t4-t3))/2 \quad (4)$$

In some embodiments, consecutive measurements of the offset also permit compensation for the slave clock's frequency drift. In some embodiments, with the time and frequency drift determined, each slave clock can be adjusted to match the wall time of the master clock by adding or subtracting the offset to or from the local wall time and adjusting the slave clock's frequency.

As noted, IEEE 802.11, "IEEE Standard for Information Technology-Telecommunications and Information Exchange Between Systems Local and Metropolitan Area Networks" provides media access control (MAC) and physical layer (PHY) specifications for implementing wireless local area networks (WLAN) referred to as basic service sets (BSS). The devices which are parts of a BSS can be identified by a service set identification (SSID) which may be assigned or established by the device which starts the network. In some embodiments, each network device or station can include a local timing synchronization function (TSF) timer. For example, in an embodiment, the device's wall clock (e.g., wall clock 406, 408) can be based on a 1 mega-Hertz (MHz) clock which ticks in microseconds. In some embodiments, during a beacon period, all stations in an independent basic service set (IBSS) can compete to transmit a beacon. In some embodiments, each station can calculate a random delay interval and can set a delay timer scheduling transmission of a beacon when the timer expires. In some embodiments, if a beacon arrives before the delay timer expires, the receiving station can cancel its pending beacon transmission. In some embodiments, the beacon can comprise a beacon frame including a timestamp indicating the TSF timer value (e.g., the wall time) of the station that transmitted the beacon. In some embodiments, upon receiving a beacon, if the timestamp is later than the receiving station's TSF timer, the receiving station can set its TSF timer (e.g., the wall clock or wall clock 408), to the value of the timestamp thus synchronizing the TSF timers (e.g., the wall clocks) of the transmitting station and the receiving station.

In some embodiments, PTP and TSF can be responsible for synchronizing the wall clocks of all nodes in the respective network to the same wall time but not for synchronizing the sample clocks controlling the processing of the various media transported by the network. In some embodiments, the sample clocks can be recovered from the data stream at each of the network's listeners (e.g., endpoints receiving the data stream) enabling different sample clocks for different media to be transported on the same network.

Figure 6:
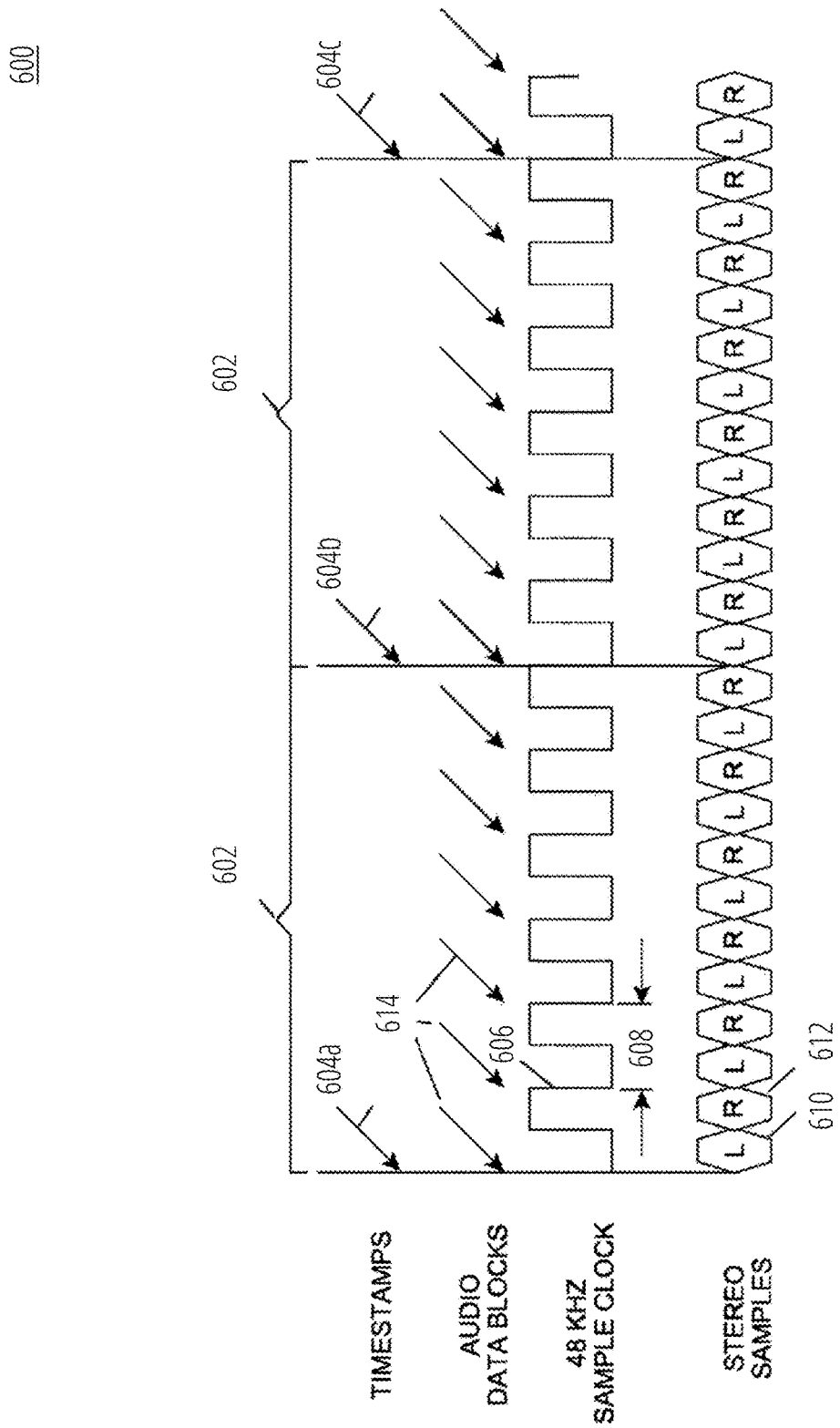
FIG. 6 illustrates a timing diagram of data transmission according to some embodiments.

Referring now to FIG. 6, FIG. 6 FIG. 6 illustrates a timing 600 diagram of data transmission according to some embodiments.

As shown, according to some embodiments, within the time interval 602 represented by successive timestamps 604a, 604b, 604c, the sample clock recoverer (e.g., recoverer 430) can trigger a clock edge 606 completing a sample clock cycle 608 for each of the data packet's application data blocks 614 specified in the data block count in the data packet header. In some embodiments, in a two channel (stereo) audio system, each I2S data block can contain a respective data sample 610, 612 for each of the two channels.

Figure 7A:
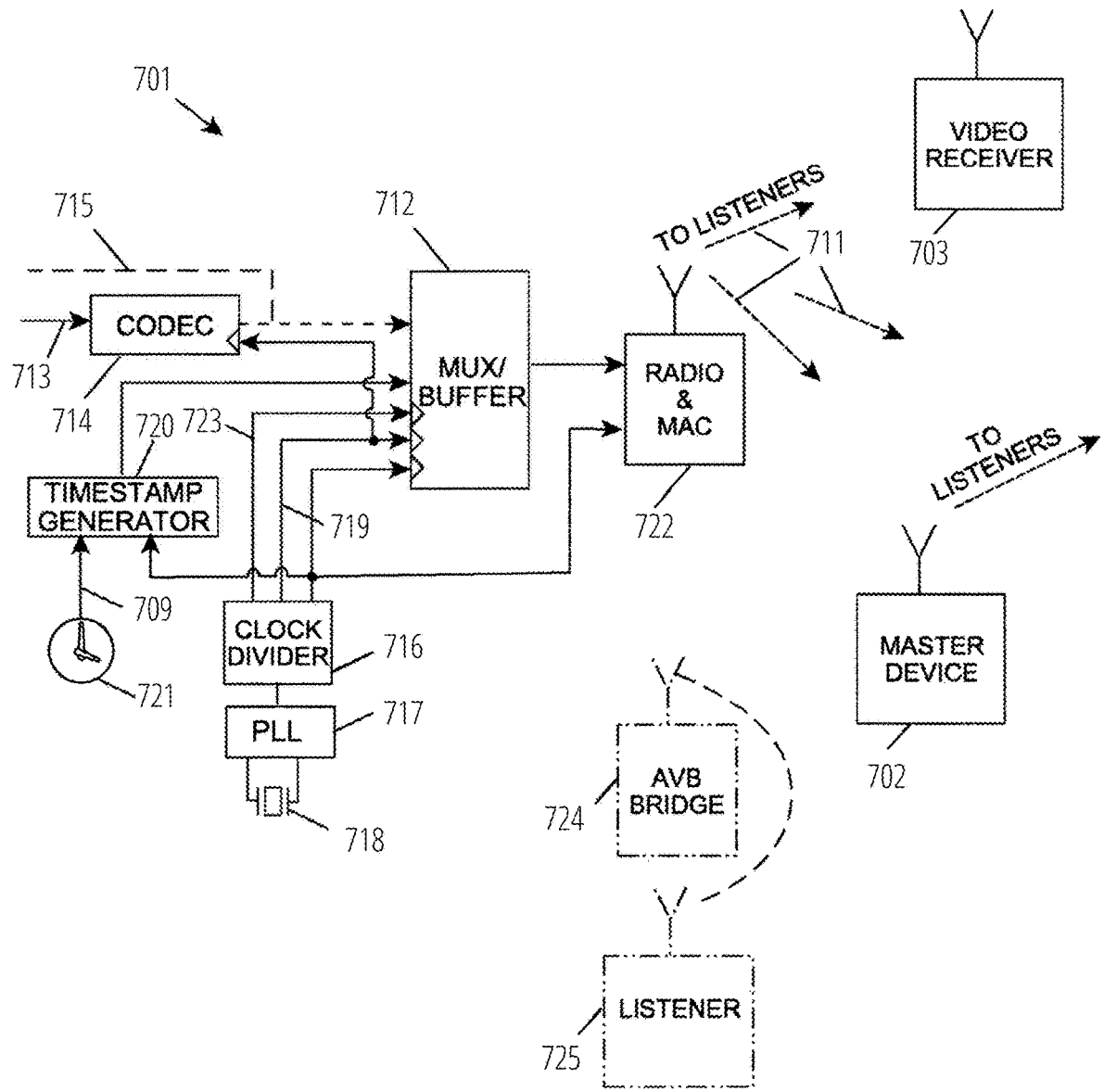
FIG. 7A is a block diagram of a first portion of a wireless network according to some embodiments.
Figure 7B:
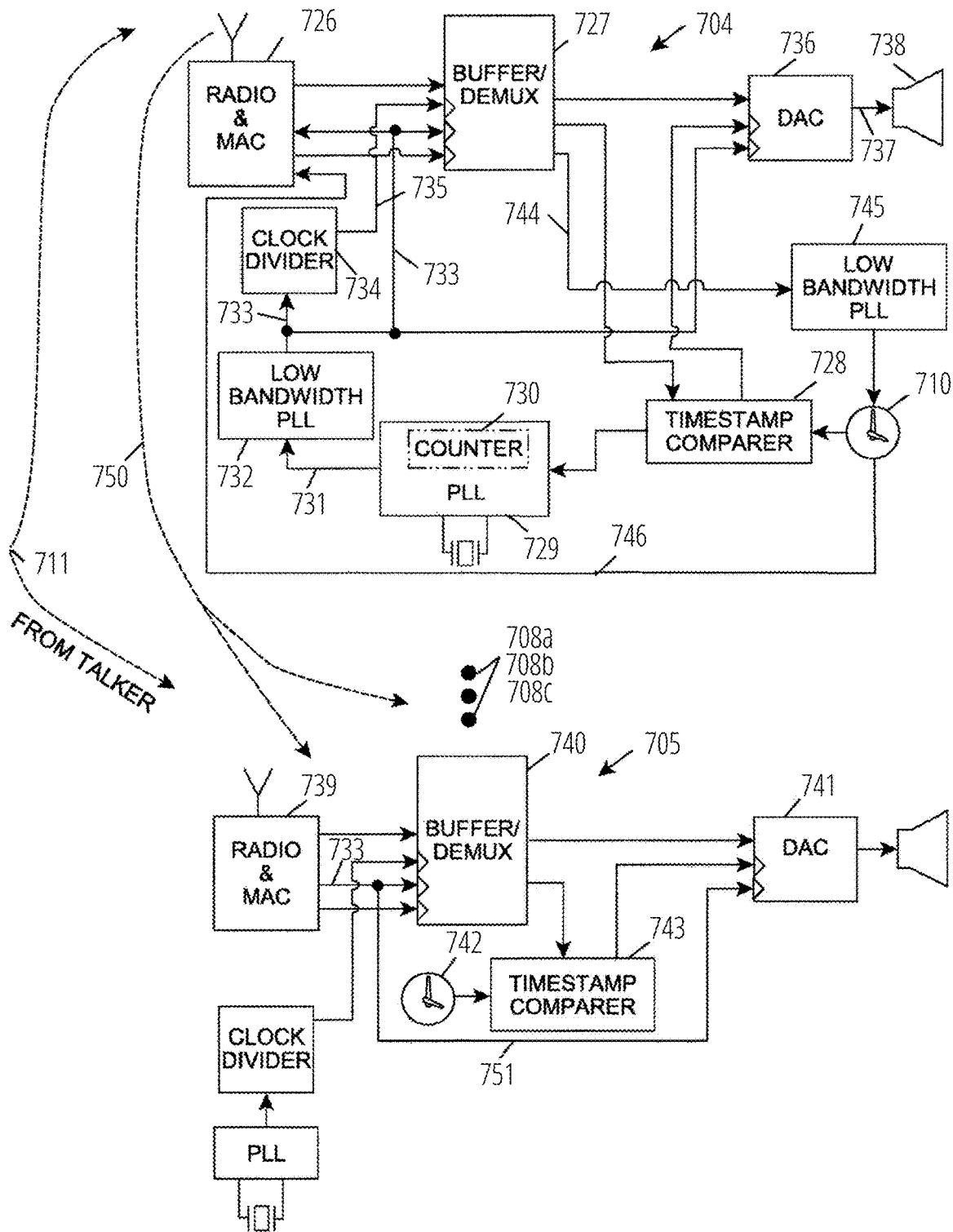
FIG. 7B is a block diagram of a second portion of the wireless network of FIG. 7A including a sample clock recoverer according to some embodiments.

Referring now to FIG. 7A-FIG. 7B, a wireless network 700 according to some embodiments is illustrated. In some embodiments, network 700 can be a network transporting video and surround sound audio. In some embodiments, network 700 can comprise a plurality of network endpoints (e.g., stations or speakers) 701, 702, 703, 704, 705, 708a-708c. In some embodiments, video display 703 and speakers 704, 705, and 708a-708c can be referred to as receivers or listeners. In some embodiments, one of the endpoints 702 can include the master clock or master TSF timer and can periodically transmit a PTP message or a TSF beacon frame to facilitate synchronization of the wall clocks, for example, wall clocks 721, 710, of the other network endpoints.

In some embodiments, one of the network's endpoints can be a talker 701 (e.g., talker 402) that can receive application data, for example, audio and/or video data, from a source such as a digital video disk (DVD) player or a television set-top box, and transmits the data in a packetized serial data stream 711 to a plurality of listeners (e.g., listener 404), for example, a wireless video display 703 and a plurality wireless speakers 704, 705, 708a-708c for multichannel surround sound. In some embodiments, a six channel surround sound audio systems, known as 5.1 ("five point one") surround systems, can utilize five full bandwidth channels; a front left channel, a front center channel, a front right channel and left and right surround channels, each reproduced by a corresponding speaker. In some embodiments, the 5.1 surround sound system can include one low-frequency effects channel, the point one (0.1) channel, which is reproduced by a subwoofer. As will be understood, increasingly, manufacturers of home theater systems are adopting eight channel (7.1) surround sound and high end systems, such as an 11.1 surround sound system, are contemplated.

In some embodiments, talker 701 can comprise a multiplexer/buffer (MUX/buffer) 712 which serially, packetizes digitized analog audio/video data 713 output by a coder/decoder (codec) 714 or digital audio/video data 715 obtained from a digital data source. In some embodiments, a clock divider 716, driven by phase locked loop (Type 2 PLL) 717 and a crystal oscillator 718, outputs a sample clock 719, an alternating signal, which times the sampling of the analog audio/video data 713 by the codec 714. In some embodiments, the sample clock 719 can be input to a timestamp generator 720 which based on wall time output 709 by the talker's wall clock 721 produces a presentation timestamp (e.g., timestamp 414) indicating the wall time for initiating presentation of application data in a data packet (e.g., packet 416) and signals the MUX to insert the presentation timestamp into the header of the data packet. In some embodiments, the sample clock 719 (e.g., sample clock 410) can be input to the MUX/buffer 712 to control the rate at which the MUX captures the data at its inputs and multiplexes the data to serial data packets containing plural application data samples, for example, audio data samples. In some embodiments, the serialized data packet can be buffered and transmitted from the buffer to a radio transceiver/media access controller (MAC) 722. In some embodiments, a bus interface clock signal 723 can time the transmission of the packetized data from the MUX/buffer 712 to the radio transceiver and MAC 722. In some embodiments, the MAC 722 can add a media access address identifying the device that is to receive the data packet and the transceiver modulates the data packet with a carrier and transmits the radio frequency data stream 711 to appropriate network listeners, for examples, a receiver of the video display 703 and the respective receivers of the surround sound audio speaker units (e.g., speakers 704, 705, 708a-708c). In some embodiments, AVB can provide for transmissions to a "bridge" 724 which can relay data transmitted by the talker 701 to a second network, including listener 725, and which can act as a slave clock to the talker network's grandmaster clock and as a master clock to the network, comprising listener 725, to which it retransmits the data.

In some embodiments, each of the network's listeners, for example, speakers 704, 705, 708a-708c of the surround sound system, can receive packetized data (e.g., data stream 711) transmitted by the talker 701 to the listener's respective MAC address. In some embodiments, in a network comprising a wireless communication link, data packets may be lost so each listener may receive only an aliased subset of the transmission. In some embodiments, in the network 700, one of the plural speaker units 508 can be designated as the sample clock recoverer for the other speakers 705, 708a-708c of the surround sound system. In some embodiments, the radio transceiver and MAC unit 726 of the sample clock recoverer can receive the steam of data packets addressed to speaker 704 and can transmit them to a buffer/DEMUX 727 where the data in the data packets can be disassembled and buffered. In some embodiments, the presentation timestamp (e.g., timestamp 414) for each data packet can be transmitted to a timestamp comparer 728.

In some embodiments, a time interval (e.g., interval 602) represented by successive time stamps is signaled to a Type 2 PLL 729 by the timestamp comparer 728. In addition, in some embodiments, the number of data blocks in a data packet, as specified in the data block count field in the packet header, can be input to a counter 730 in a feedback loop of the PLL 729. In some embodiments, within the time interval represented by the difference between successive timestamps, the counter 730 in the feedback loop can cause the PLL 729 to output an alternating signal, a raw recovered sample clock 731, with a respective clock edge (e.g., edge 606) for each of the data blocks (e.g., blocks 614) included in the data packet. In some embodiments, the raw recovered sample clock 731 can be input to a low bandwidth Type 2 PLL 732 which can frequency filter the raw sample clock signal to eliminate jitter and produce a cleaner bandlimited recovered sample clock 733 signal. In some embodiments, band limiting the recovered sample clock signal can produce a signal with a frequency centered on the mean frequency of the raw signal, thereby reducing jitter in the sample clock signal so that the sample clocks of other listeners utilizing the recovered sample clock, for example, the other surround sound speakers 705, 708a-708c, are more nearly identical to the recovered sample clock 733 signal.

In some embodiments, the bandlimited recovered sample clock 733 can also be input to a clock divider 734 which can output a bus clock signal 735 to the buffer/DEMUX 727. In some embodiments, the recovered sample clock 733 signal can be transmitted to the buffer/DEMUX 727 and to the digital-to-analog converter (DAC) 736 to control the processing rate for the audio data samples contained in the data packets. In some embodiments, the timestamp comparer 728 can compare the timestamp in the data packet to the wall time of the slave clock 710 of the speaker unit and can appropriately output a signal to the DAC when the DAC is to initiate converting the respective digital audio data, at the rate established by the recovered sample clock 733, to an analog signal 737 which can control the operation of the speaker 738.

In some embodiments, the bandlimited recovered sample clock 733 can be transmitted to the transceiver and MAC 726 of the sample clock recoverer (e.g., speaker 704) where it can be modulated with a carrier and transmitted to other surround sound speakers 705, 708a-708c. In some embodiments, to anticipate packet loss and satisfy the Nyquist sampling criterion, the rate at which the sample clock information is updated at the other speakers can be set at least twice the limiting bandwidth of the recovered sample clock. For example, in some embodiments, if the timing at a speaker is updated every 100 ms and the peak packet error rate (PER) is 75%, the low bandwidth PLL 732 of the sample clock recoverer, speaker 704, can be set to no more than 1.25 Hz. In some embodiments, the modulated recovered sample clock signal can be received by the transceiver and MAC 739 of the other speaker unit(s) where it can be input to the respective buffer/DEMUX units 740 and transmitted to the DAC 741 to control the rate at which audio data samples in data packets addressed to the respective MAC by the talker 701 are processed. In some embodiments, the timestamps (e.g., timestamps 414) in the data stream can be separated from the application data and compared to the synchronized local wall time 742 by the timestamp comparer 743 which can signal the buffer/DEMUX to input the application data from the respective data packet to the DAC 741 for presentation by the speaker.

Figure 7C:
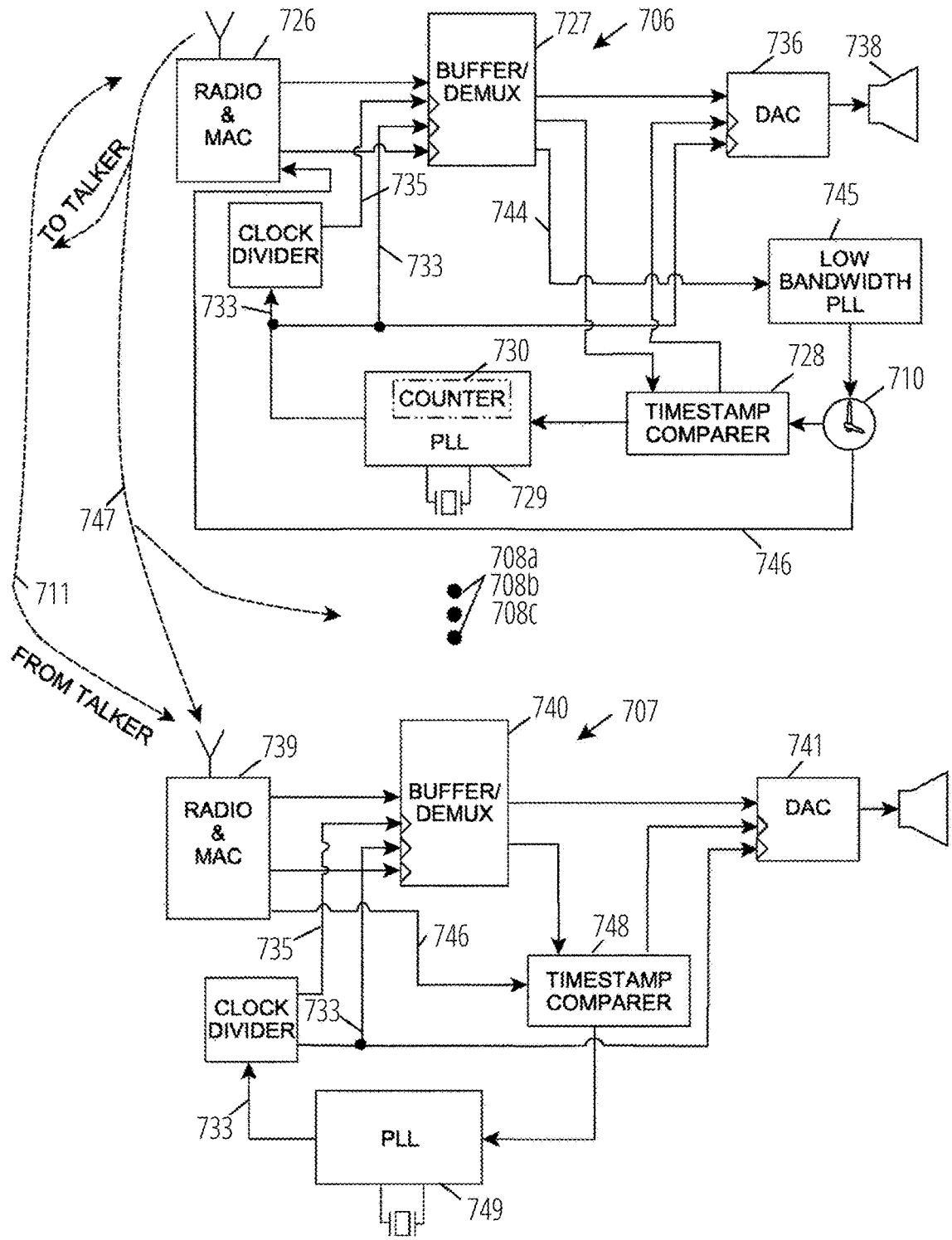
FIG. 7C is a block diagram of a second portion of the wireless network of FIG. 7A including a sample clock recoverer according to some embodiments.

In some embodiments, the bandlimited sample clock can be recovered without frequency filtering the raw sample clock output. Referring now to FIG. 7C, the raw PTP and TSF wall time data 744 contained respectively in the PTP messages and TSF beacon frames can be separated in the buffer/DEMUX 727 of the listener 706 and transmitted to a frequency filtering device, for example, a low band width Type 2 PLL 745, to band limit the wall time around the average or mean frequency. In some embodiments, the bandlimited PTP and TSF time signal (e.g., wall time 746) reduces jitter at the wall clock 710 of the listener 706 which band limits the sample clock 733 output of the PLL 729 which is input to the buffer/DEMUX 727 and the DAC 736. In some embodiments, the bandlimited wall time 746 is transmitted 747 to the other listeners 707, 708a-708c, including the talker 701, where it is input to the respective timestamp comparers 748, 720 causing the bandlimited sample clock 733 to be output by the respective PLL 749. In some embodiments, the application data in the data stream 711 from the talker is processed at a rate determined by the bandwidth limited sample clock 733 and presented at wall times determined by the synchronized local wall time 746.

Returning briefly to FIG. 7B, in some embodiments, the frequency filtering function can be applied to both the output of the PLL 729 and the raw wall time data 744. In some embodiments, the low bandwidth PLL 745 can band limit wall time 746 which can be transmitted to the other listeners of the network with the bandlimited sample clock 733.

In some embodiments, by introducing a frequency filtering function in the clock path with the low bandwidth PLL 732 and/or the low bandwidth PLL 745 jitter can be removed from the sample clock and/or the wall clock, thereby substantially reducing aliasing and improving the synchronization of the outputs of the network.

U.S. patent application Ser. No. 14/186,852, incorporated by reference herein in its entirety, discusses a hardware methodology for recovering and filtering audio timing. In some approaches discussed therein, the key circuit element, which is not available on most generic processor SOCs, was a low bandwidth Phase lock Loop (PLL). In those approaches, said PLL was used twice, to filter the beacon based Time Synchronization function (TSF) value and to generate an output audio clock. In some embodiments described herein, these two PLL hardware functions can be implemented at least in part as computer readable instructions, referred to as an Estimator and a Sample Rate Converter (SRC).

For example, according to some embodiments, a TSF PLL as described with respect to FIG. 7A-FIG. 7C (e.g., PLL 729) can be implemented as an estimator which measures and filters TSF value against the internal Counter/Timer of an audio subsystem processor.

Figure 8:
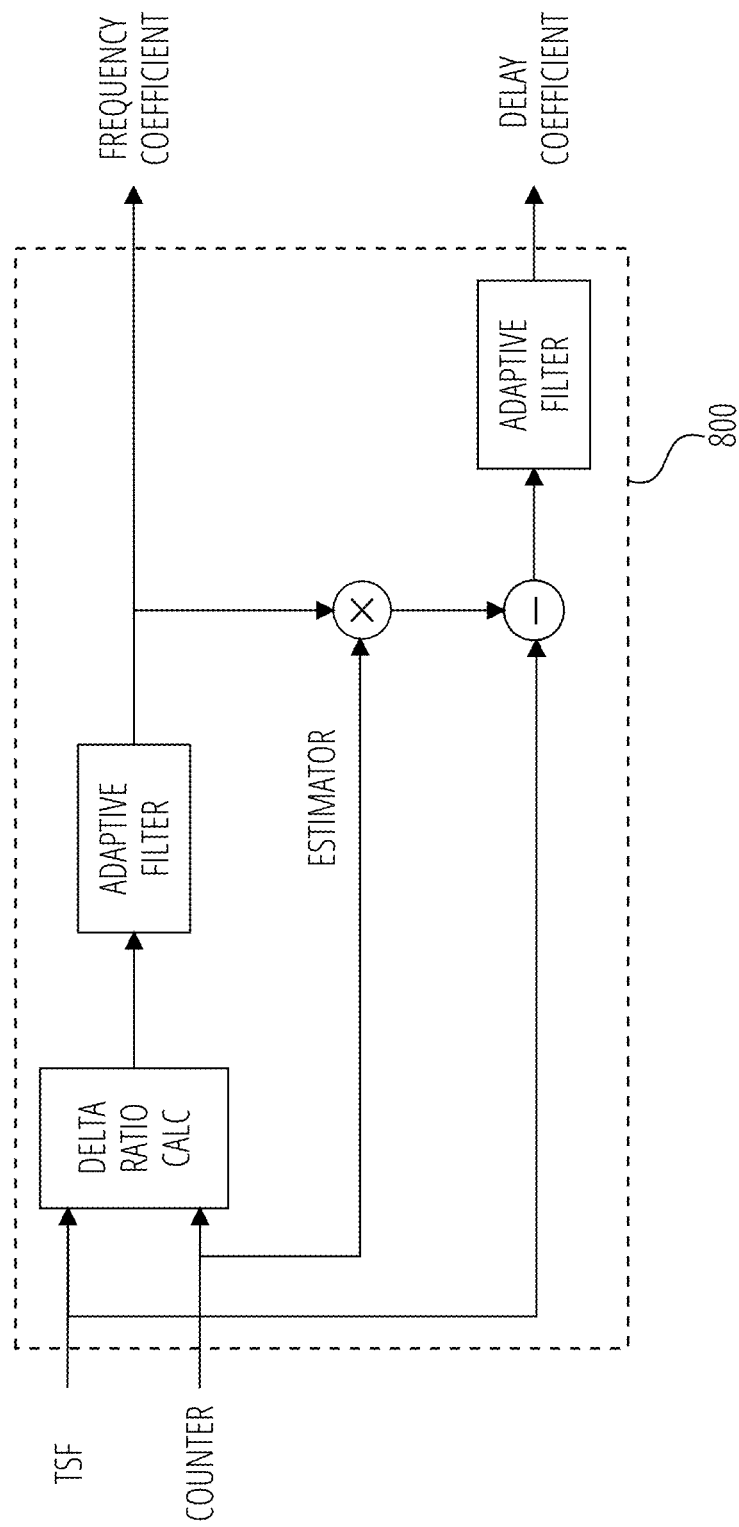
FIG. 8 is a block diagram of an estimator with TSF and Counter pairs according to some embodiments.

Referring now to FIG. 8, FIG. 8 is a block diagram of an estimator 800 according to some embodiments. In some embodiments, in estimator 800, TSF and Counter pairs can be sampled at the same instant. In some embodiments, the Estimator 800 can be presented with TSF and Counter pairs sampled at the same instant, so that the frequency and delay relationship between the two can be determined.

Figure 9:
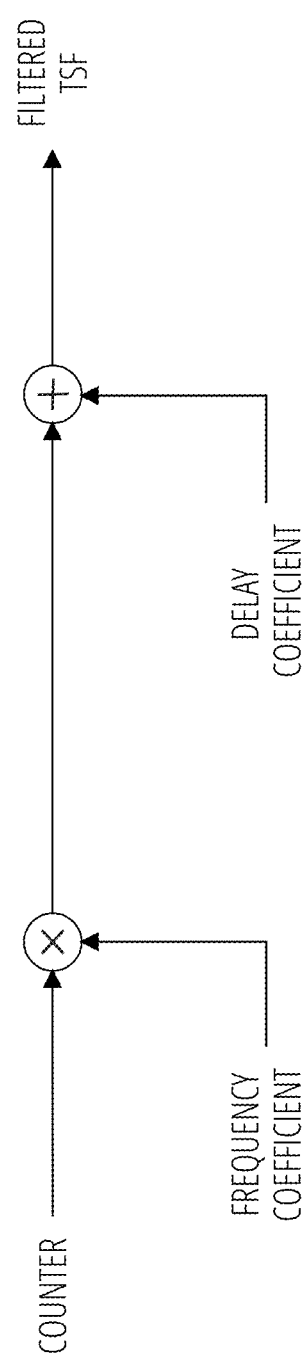
FIG. 9 is a graphical representation of generated Frequency and Delay Coefficients according to some embodiments.

Referring briefly to FIG. 9, FIG. 9 is a graphical representation of generated Frequency and Delay Coefficients that can then be applied to the Counter value at any time to generate the filtered TSF, according to some embodiments. In some embodiments, from the estimator 800 shown in FIG. 8, the Frequency and Delay Coefficients can be generated which then can be applied to the Counter value at any time to generate the filtered TSF value, as shown in FIG. 9. In some embodiments, adaptive filters can be used so that the Coefficients are available immediately to be used to process audio and over time will improve in accuracy by lowering the jitter.

In some embodiments, the filtered TSF value can be used at the audio talker to generate the Presentation Time of the block of audio data that is transmitted. In some embodiments, the block size can be set to be some multiple of the audio data interleaver length.

Figure 10:
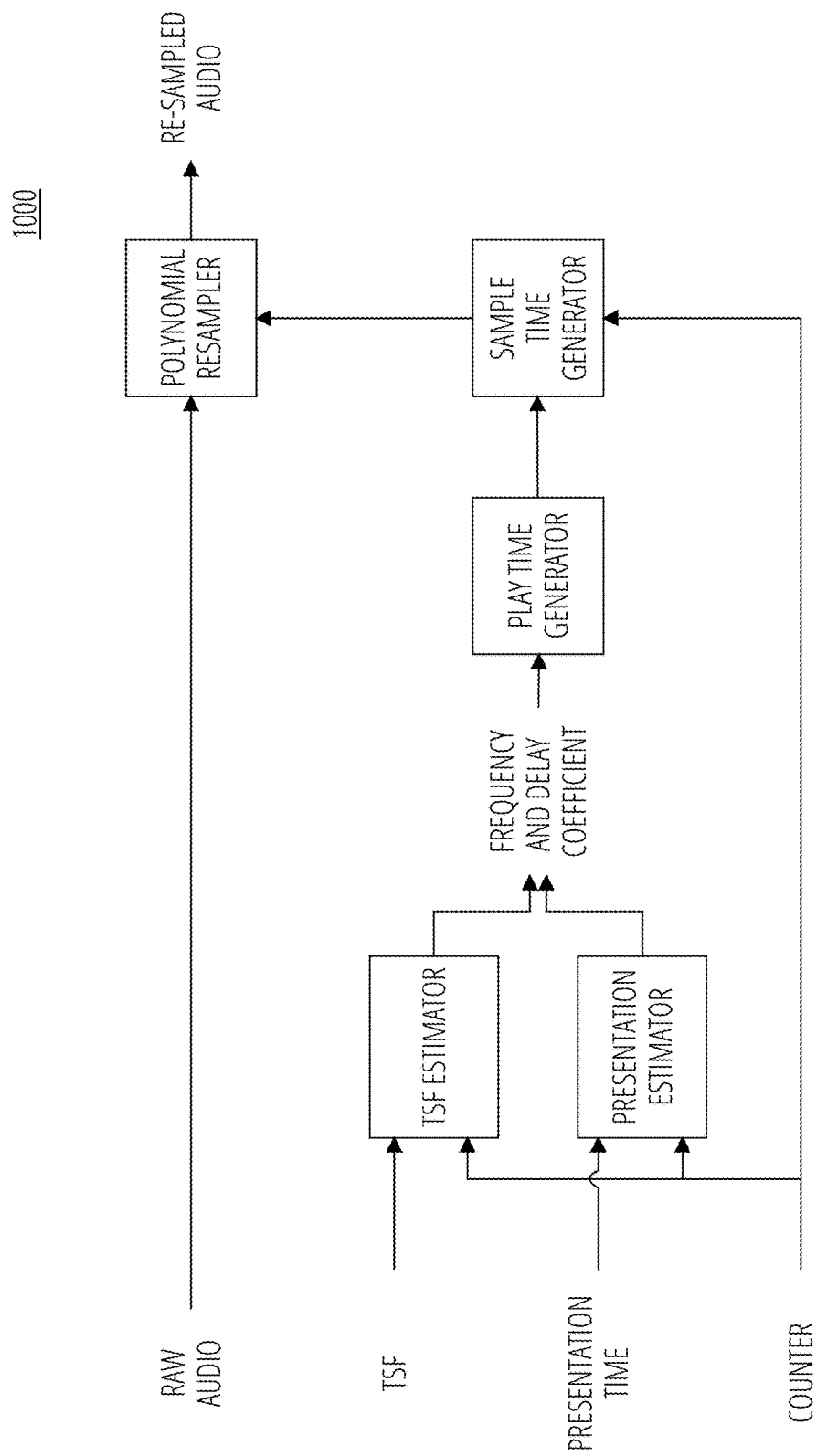
FIG. 10 is a block diagram of a system for resampling audio according to some embodiments.

FIG. 10 is a block diagram of a system 1000 for resampling audio according to some embodiments. As illustrated in FIG. 10, in some embodiments, system 1000 resamples audio to the local audio clock rather than using a PLL to generate the clock. In some embodiments, at the audio listener, the Presentation Time and the beacon TSF values can be estimated to the local audio clock by the same method used at the audio transmitter source. In some embodiments, the audio can then be resampled to the local audio clock rather than use a PLL to generate the clock as shown in FIG. 10.

Figure 16:
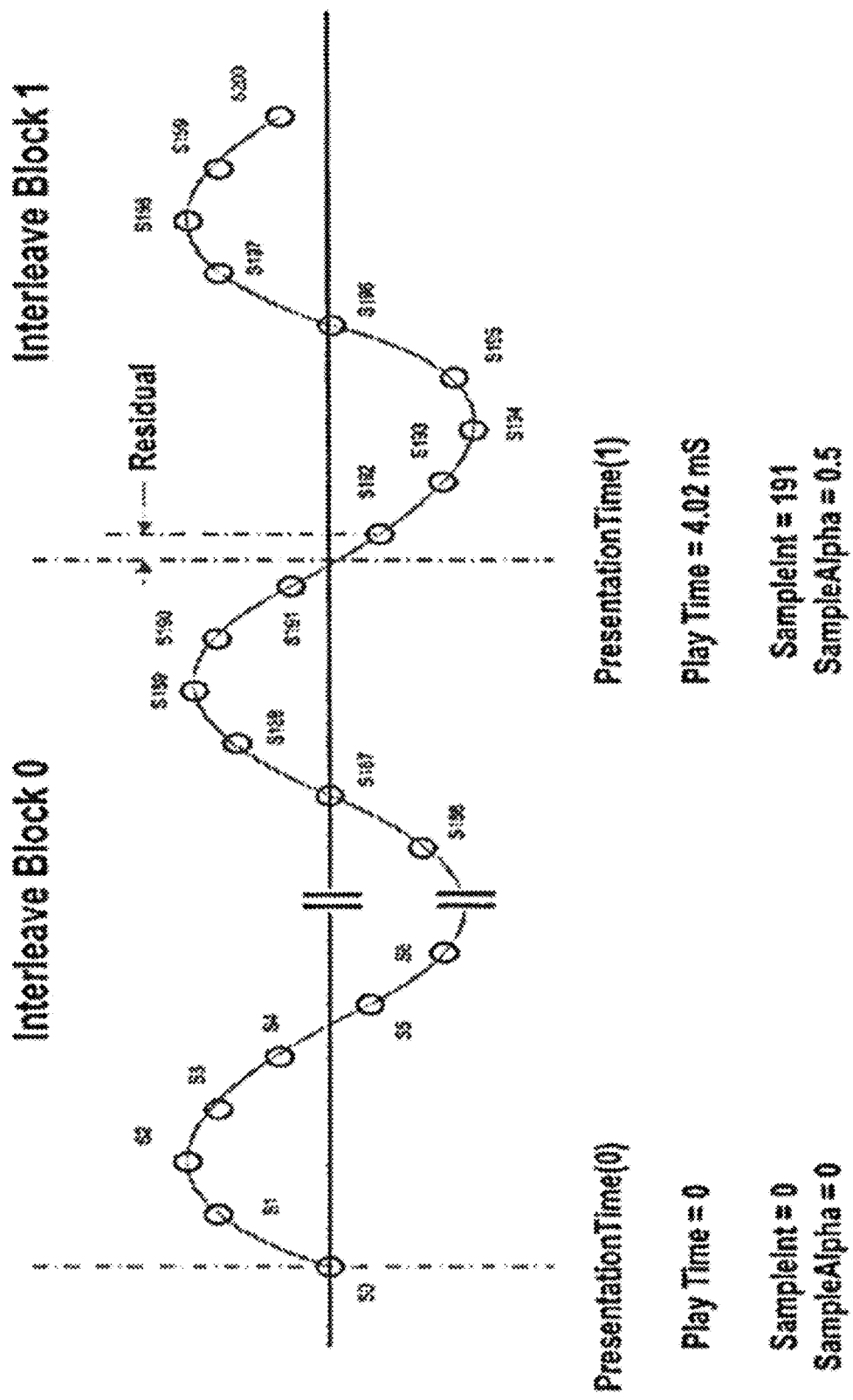
FIG. 16 is a graphical representation of a sample timing for a resampler according to some embodiments.

In some embodiments, the frequency and delay coefficients can be combined (e.g., the Frequency Coefficients are multiplied and Delay Coefficients are added) to make the Play Time of each block. In some embodiments, the Play Time can be used to generate the sample timing for a resampler (e.g., as illustrated in FIG. 16). Referring briefly to FIG. 16, FIG. 16 illustrates a non-limiting example of the sample timing described above according to some embodiments. In FIG. 16, Sx denotes sampling intervals.

In some embodiments, at the start of audio playback, the sample spacing can be assumed to be ideal, and at the beginning of each new block, the Play Time can be compared to elapsed time to that point. In some embodiments, the residual error from the previous block can then be compensated for or distributed over the new block dividing the previous error equally over all samples of the new block or alternatively future blocks recursively. In some embodiments, this approach can allow the audio playback to start immediately without having to wait for the next PlayTime to determine the exact sample spacing.

According to some embodiments, in a hardware implementation, a low bandwidth Phase lock Loop (PLL) can be used for recovering and filtering audio timing. In some embodiments, the PLL can be used twice—to filter the beacon based Time Synchronization function (TSF) value and to generate an output audio clock (e.g., PLL 729 and counter 730). According to some embodiments, in a software implementation these two hardware functions can be substituted by an Estimator (e.g., Estimator 800) and a Sample Rate Converter (SRC).

According to some embodiments, for example as illustrated in FIG. 8, the TSF PLL can be replaced with an Estimator which measures and filters TSF value against the internal Counter/Timer of the audio subsystem processor. In some embodiments, the Estimator can be presented with TSF and Counter pairs sampled at the same instant so that the frequency and delay relationship between the two can be determined. In some embodiments, the Interleavering Block Size can be as shown in Table 1:

TABLE 1

| | Interleaver size: in packets per interleaving | |
|---|---|---|
| At 48 kHZ | 4 | 8 |
| Packet size: in samples per packet | 48 96 | 192 384 | 384 768 |

According to some embodiments, recovering audio timing in a network can include bandlimiting a raw wall time signal about a mean frequency of the raw wall time signal by estimating the frequency and delay of the raw wall time signal to a local transmitter audio clock; including timing datum in a data packet about the mean frequency of the timing signal from the estimate of the frequency and delay of the timing signal and the audio Play Time at the transmitter; bandlimiting the raw wall time signal about the mean frequency of the raw wall time signal by estimating the frequency and delay of said raw wall time signal to a local receiver audio clock; combining both wall time estimation and received timing datum estimation from a packet to generate an audio play time at the receiver; and using the PlayTime to generate coefficients for a polynomial interpolator that resamples the audio to the receiver audio clock.

According to some embodiments, an audio system is provided. In some embodiments, the audio system can comprise a first listener having a wall clock maintaining a wall time for occurrence of an event, said wall time updated by data transmitted by a master clock and received by said first listener; a sample clock recoverer retrieving a sample clock from data received by said first listener from a talker, said sample clock regulating a processing rate for a datum included in said data received from said talker; and a frequency filter bandlimiting said sample clock output by said sample clock recoverer, wherein said frequency filter comprises an estimator connected to receive said sample clock output by said sample clock recoverer; and a transmitter transmitting said bandlimited sample clock. In some embodiments, the audio system can further comprise a second listener arranged to receive said transmitted bandlimited sample clock and use said bandlimited sample clock to regulate processing data received from said talker. In some embodiments, the audio system can include that first listener is a frequency filter attenuating a frequency of said updating data received from said master clock. In some embodiments, the audio system can include that the updating data received from said master clock is a timing synchronization function datum or a precision time protocol datum.

According to some embodiments, an Estimator is provided that can perform three algorithmic phases that operate to cancel audio echo. In some embodiments, the Estimator can comprise an Adaption phase, a Settling phase, and a Frequency Tracking phase. In some embodiments, in the Adaptation phase, the Estimator can measure the timing relationship between the internal Counter/Timer of an audio subsystem processor and a Wi-Fi Network Time Synchronization Function using the linear equation: Filtered TSF=Counter*Frequency Coefficient+Delay Coefficient, as shown in FIG. 9.

In some embodiments, the Estimator can be presented with TSF and Counter pairs sampled at the same instant so that the frequency and delay relationship between the two can be determined. In some embodiments, the Estimator can use a fixed number of samples (N) in its processing. In some embodiments, the value of N can be determined by the target timing jitter output of the Estimator and the input jitter from the TSF sampling. In some embodiments, the input to output jitter can be reduced by the Square Root of N. In some embodiments, the value for N is 1024 and the jitter reduction is 32.

In some embodiments, in the Adaptation phase, there may be less than N samples available, but the available samples can be used to generate a Filtered TSF although the jitter reduction of 32 may not yet be met.

In some embodiments, where it is not possible to obtain the Wi-Fi Network Time Synchronization Function, the Estimator can use other methods to determine the filtered TSF. In some embodiments, the Estimator can use a pseudo beacon where a TSF can be generated by the audio system and transmitted to output devices, such as audio speakers, that are connected to a wireless network. In some embodiments, the output devices accept the generated TSF as the network time. In some embodiments, the Estimator can also query the output devices for a time function and use the returned time function as the TSF. In some embodiments, the output devices can have access to the Wi-Fi TSF and return that value to the Estimator. In some embodiments, the Adaptation phase can use any timing method that represents time in a first order linear relationship (y=mx+b) where, if plotted on a 2-dimensional x/y axis, m is the slope of the line and b is the y-intercept. The y-intercept of this line is the value of y at the point where the line crosses the y axis.

In some embodiments, in the Settling phase, there can be sufficient samples to achieve the jitter reduction of 32. In some embodiments, these samples can be processed and output until the transient response of the N length filter has settled.

Figure 14:
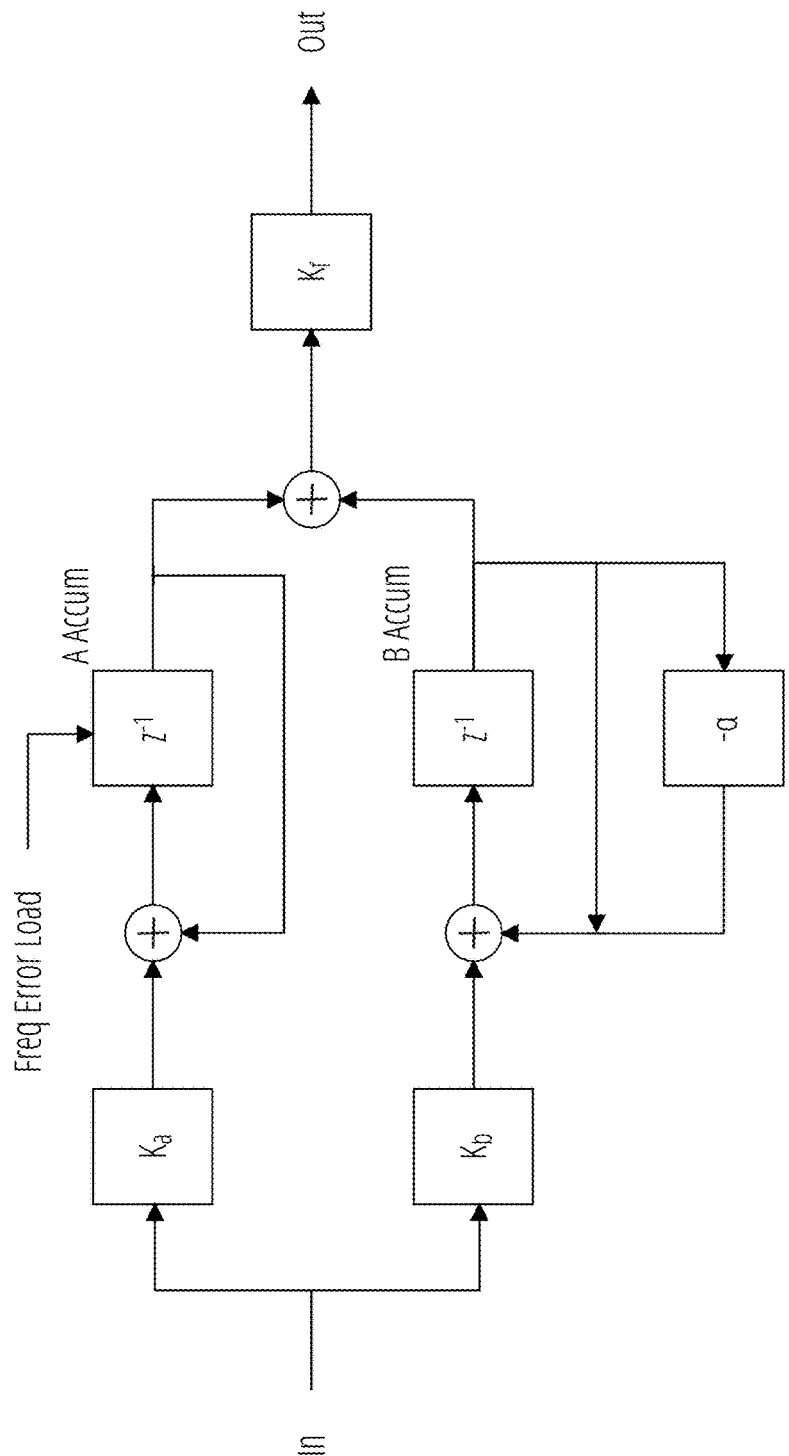
FIG. 14 is a block diagram illustrating an adjustable filter according to some embodiments.

Non-limiting examples of the Adaption and Settling phases can be illustrated as shown in FIG. 8. Another non-limiting example of the Settling phase is illustrated in FIG. 14.

According to some embodiments, in the Adaption and Settling phases, a TSF, whether it be the Wi-Fi TSF accessed by the audio system, a pseudo TSF, or a TSF returned by querying an output device and a Counter can be input into a Delta Ratio Calculation. In some embodiments, the Delta Ratio Calculation function can be the change of the TSF value divided by the change in the Counter value. In some embodiments, with the variable n representing the index of the TSF and Counter sample pairs, the Delta Ratio=$\{TSF(n)-TSF(n-1)\}/\{Counter(n)-Counter(n-1)\}$. In some embodiments, where the samples may be taken at a fixed counter increment interval, the Delta Ratio Calculation can be expressed as $\{TSF(n)-TSF(n-1)\}/CounterInterval$. In some embodiments, the output can be passed through an Adaptive filter, which is a filter that changes over time. In some embodiments, in the first iterations of the Estimator, the Adaptive filter can operate based on the number of N samples that have occurred. In some embodiments, in subsequent iterations of the Estimator, the number of N samples used in the Adaptive filter can be sufficient to achieve the desired jitter reduction. In some embodiments, the Adaptive filters allow that the Coefficients are available immediately to be used to process audio and over time will improve in accuracy by lowering the jitter.

According to some embodiments, the output of the Adaptive filter can be the Frequency Coefficient. In some embodiments, to calculate the Delay Coefficient, the Frequency Coefficient can be multiplied by the Counter, as shown in FIG. 9, then reduced by the TSF. In some embodiments, that result can then run through the Adaptive filter. In some embodiments, the output from the Adaptive filter can be the Delay Coefficient.

In some embodiments, in the Frequency Tracking phase, after the Frequency Coefficient and Delay Coefficient have been determined, the crystal drift of an audio system can be tracked and adjusted for. In some embodiments, the determined Frequency and Delay Coefficients can be stored in registers. In some embodiments, the Delay Coefficient can be set and may not change during the Tracking phase, but very small adjustments can be made to the Frequency Coefficient. In some embodiments, the Frequency Coefficient can be tracked and adjusted to eliminate the crystal drift of the system. In some embodiments, crystals in an audio system may change their oscillation frequency, because of changes in temperatures or power supply voltages.

According to some embodiments, in the Frequency Tracking phase the frequency adjustment range can be limited to +/−3 PPM per second. In some embodiments, if the frequency slew exceeds this limit, Audio Echo Cancelling (AEC) applications on the audio system may fail.

Figure 11:
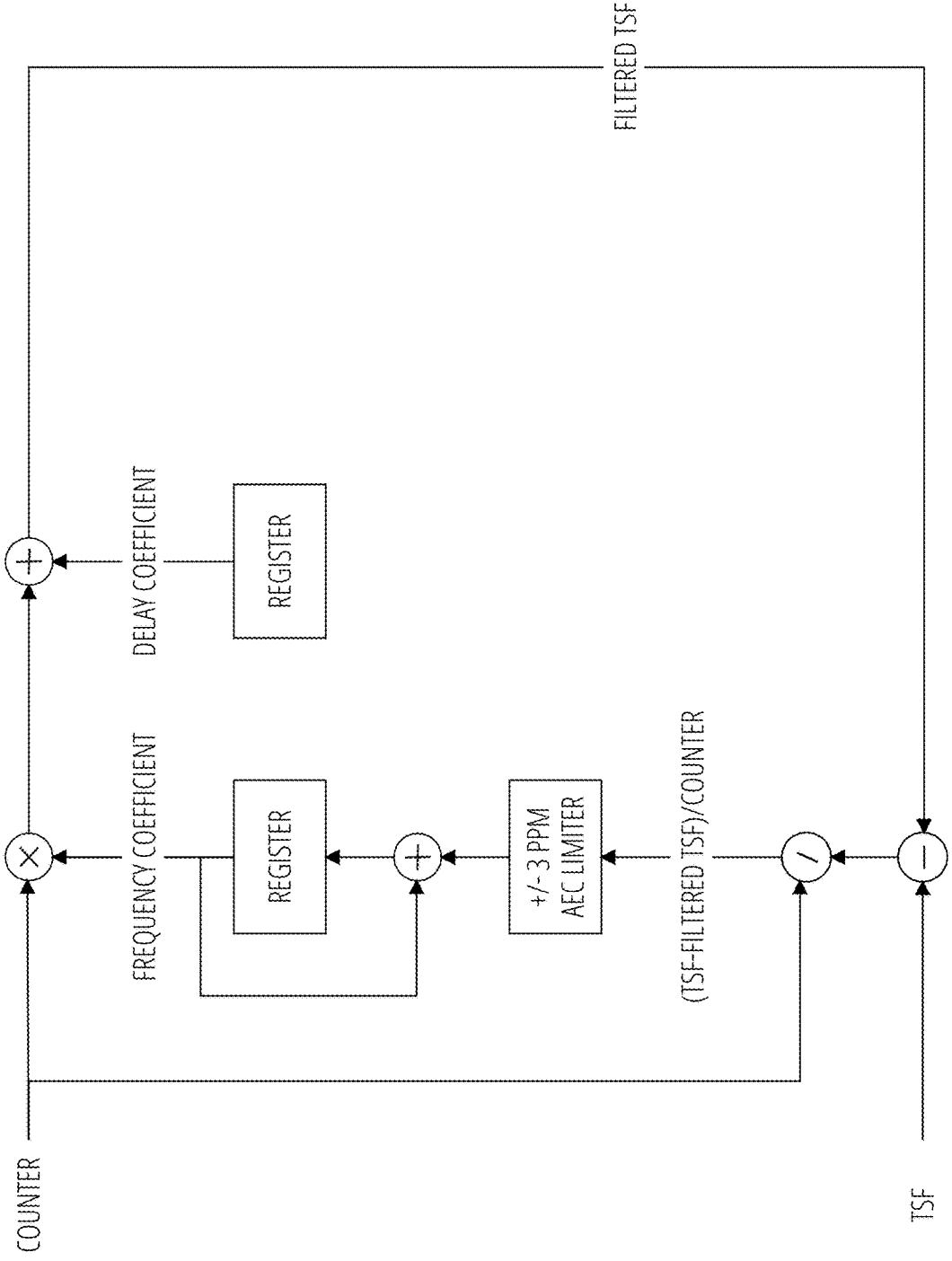
FIG. 11 is a block diagram illustrating a system for effecting Frequency Tracking according to some embodiments.

Referring to FIG. 11, FIG. 11 is a block diagram illustrating a system for effecting Frequency Tracking according to some embodiments. According to some embodiments, during the Frequency Tracking phase, the Counter can be multiplied by the Frequency Coefficient that was determined in the Adaptation and Settling phases (e.g., as shown in FIG. 11). In some embodiments, the Delay Coefficient can be retrieved from memory and added to the resultant to produce the Filtered TSF. In some embodiments, the actual TSF, which can be a Wi-Fi Network Time Synchronization Function, a generated pseudo beacon TSF, a queried time value, or any value that represents time as a function of $y=mx+b$, can be subtracted from the Filtered TSF to generate an averaged timing offset. In some embodiments, the averaged timing offset can be divided by the counter then limited by a plus-or-minus 3 parts per million AEC limiter to create a limited value.

In some embodiments, the limited value can then be added to the pre-existing Frequency Coefficient, and then stored in memory. In some embodiments, this process can be repeated as long as the audio system is in use. In some embodiments, the addition of the limited value to the Frequency Coefficient can be an accumulator where the error in the Frequency Coefficient is accumulated and stored over time. In some embodiments, the Delay Coefficient may not adjusted and remains at the value that was determined in the Adaptation and Settling phases.

Figure 12:
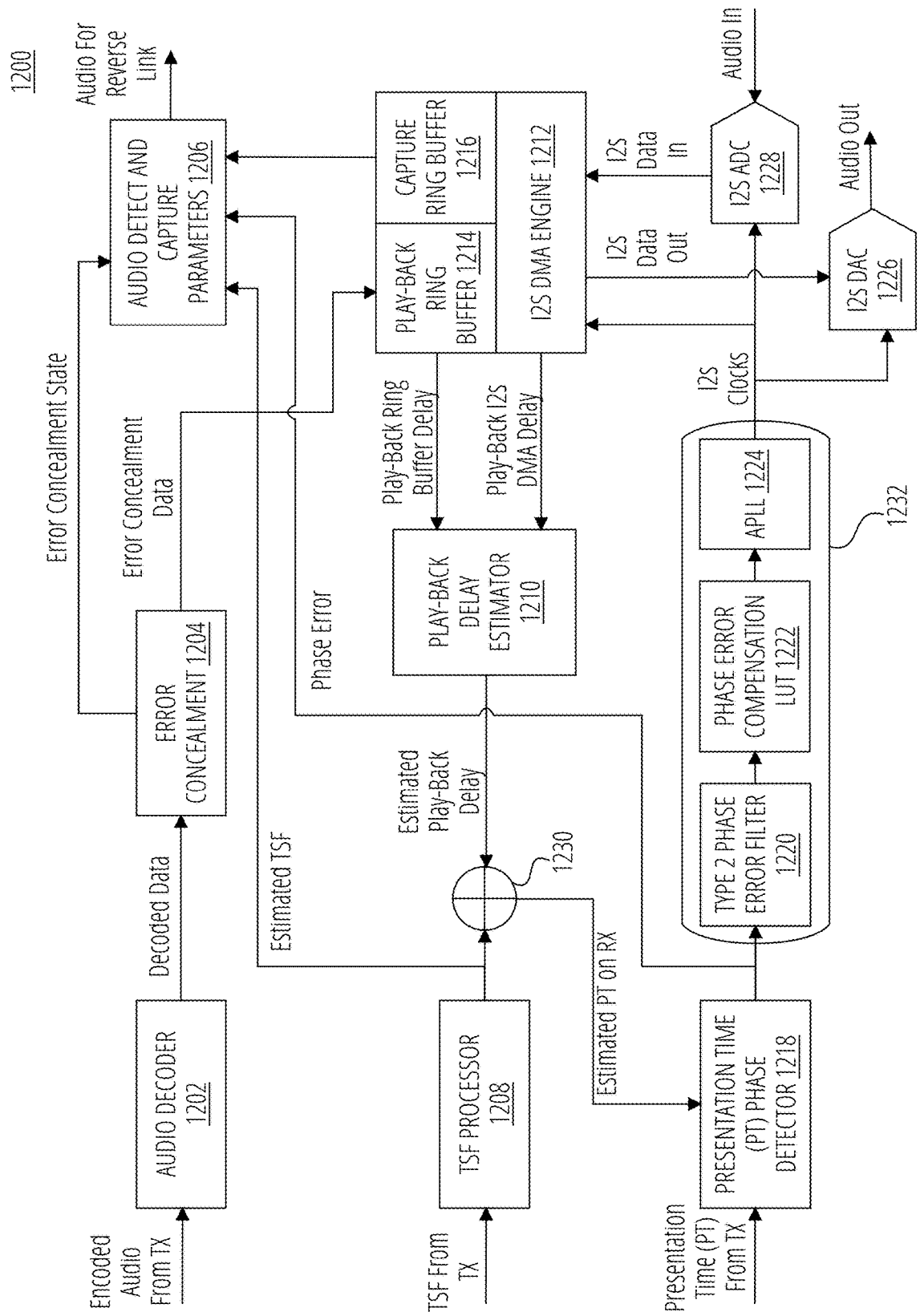
FIG. 12 is a block diagram illustrating a system for presentation of audio blocks according to some embodiments.

Turning now to FIG. 12, FIG. 12 is a block diagram illustrating a system 1200 for presentation of audio blocks according to some embodiments. In some embodiments, system 1200 can be used for time-aligned presentation of audio blocks received via a forward link. In some embodiments, system 1200 can employ a Phase Locked Loop (PLL). In some embodiments, system 1200 can employ a Presentation Time Locked Loop (PTLL). In some embodiments, system 1200 can be implemented in a receiver.

According to some embodiments, system 1200 results in the presentation alignment of the receiver with the transmitter of audio blocks. In some embodiments, when using PTLL, a PT received by a receiver (e.g., RxSpeaker) from a transmitter (e.g., TxSpeaker) included in the forward link audio blocks is periodically compared to an Estimated PT calculated by the receiver. In some embodiments, the Estimated PT by the receiver can be an estimate of the TSF-based time at which the receiver will actually present an audio block. Then, in some embodiments, the system 1200 can calculate a PT Phase Error. In some embodiments, a PT Phase Error can be the difference between the PT received from the transmitter and the Estimated PT by the receiver. In some embodiments, system 1200 can use the PT Phase Error to determine a compensation to properly adjust at least one of an Analog Phase-Locked Loop (APLL) or a Sample Rate Converter (SRC) of the PTLL, such that the PT Phase Error is driven toward zero, resulting in receiver audio alignment.

In some embodiments, PTLL can employ an APLL. In some embodiments, PTLL can employ an SRC. In some embodiments, an APLL can provide access to a dynamically adjustable Inter-IC Sound (I2S) clock (via an APLL). In some of those embodiments, the PTLL is used to adjust an I2S clock rate. In some embodiments, where access is not provided to an adjustable I2S clock, PTLL can employ a software-based SRC that allows for adjustment of I2S data.

Returning to FIG. 12, FIG. 12 depicts a non-limiting example of system 1200 employing PTLL with an APPL. In some embodiments, system 1200 can be implemented on a receiver. According to some embodiments, audio block packets sent from the transmitter (e.g., TX) to the receiver (e.g., RX) via the Forward Link can include Encoded Audio from TX. In some embodiments, Encoded Audio from TX can be a block of audio data that is to be presented at the RX. In some embodiments, the Encoded Audio from TX is received by an audio decoder 1202 and decoded into Decoded Data. In some embodiments, the Decoded Data is processed through an error concealment operation 1204. In some embodiments, error concealment 1204 can compensate for packets that were either missing due to interference, or dropped due to late arrival. In some embodiments, error concealment 1204 may yield an Error Concealment State and Error Concealment Data, In some embodiments, the Error Concealment State can contain information that describes how an audio block was re-constructed.

According to some embodiments, audio block packets sent from the TX to the RX (e.g., RX) via the forward link can include a Presentation Time (PT) from TX (PT from TX). In some embodiments, the PT from TX can be a TSF-based time at which an audio block (e.g., a forward audio block) must be presented in order to maintain time-alignment across all speakers (e.g., TX and RX). In some embodiments, PT from TX can be received by a Presentation Time (PT) Phase Detector 1218 (PT Phase Detector).

According to some embodiments, audio block packets sent from the TX to the RX (e.g., RX) via the forward link can include a current value of the Timing Synchronization Function from TX (TSF from TX or TSF value). In some embodiments, the TSF can be received in a standard beacon as described by the IEEE 802.11 standard. In some embodiments, the TSF from TX is received by a TSF processor 1208. In some embodiments, TSF processor 1208 can track the TSF value and provide an Estimated TSF Time value (Estimated TSF). In some embodiments, the Estimated TSF value can be used to timestamp captured microphone data. In some embodiments, captured microphone data time-stamped with the current TSF can be used to determine a timing relationship of the captured data to presented content. In some embodiments, this timing relationship can then be used to filter the presented audio from the captured data.

In some embodiments, the Estimated TSF from TSF processor 1208 can be combined with Estimated Play-Back Delay from a Play-Back Delay Estimator 1210 using combination operation 1230 to generated an Estimated PT on RX. In some embodiments, the Estimated PT on RX can be an estimate of the TSF-based time at which an audio block will be presented. In some embodiments, operation 1230 includes summing a current Estimated TSF and an Estimated Play-Back Delay. In some embodiments, the Estimated Play-Back Delay can specify the amount of time that will pass before the most recently received audio block will be presented. In some embodiments, the Estimated Play-Back Delay can be based upon the number of audio samples that have already been written to an I2S Ring Buffer or Play-Back Ring Buffer 1214 and/or I2S DMA Engine 1212 DMA stages. In some embodiments, the Estimated Play-Back Delay is calculated by the Play-Back Delay Estimator 1210 based on a Play-Back Ring Buffer Delay and a Play-Back I2S DMA Delay form Play-Back Ring Buffer 1214 and I2S DMA Engine 1212, respectively.

In some embodiments, PT Phase Detector 1218 can compare the Estimated PT on RX with the PT from TX to determine a Phase Error (e.g., a PT Phase Error). In some embodiments, the Phase Error can be provided to an I2S Clock Generator 1232 to generate an I2S clock. In some embodiments, I2S Clock Generator 1232 can be an I2S Clock Generator as described in relation to FIG. 13. In some embodiments, the Phase Error can be provided to a Phase Error Filter 1220. In some embodiments, Phase Error Filter 1220 is a Type 2 Filter. In some embodiments, Phase Error Filter 1220 can be a filter as discussed in relation to FIG. 13. In some embodiments, a Type 2 Filter can drive the static (D.C. or average) timing error of a loop (e.g., PTLL or APLL) to zero. In some embodiments, the output of the Phase Error Filter 1220 can be applied as an index to a compensation divider Look-Up Table (LUT) on Phase Error Compensation LUT 1222.

In some embodiments, Phase Error Compensation LUT 1222 can produce an appropriate frequency adjustment to APLL 1224. In some embodiments, the frequency adjustment can be achieved by changing an input and feedback divider ratios of APLL 1224. In some embodiments, the PTLL can provide a feedback loop that uses the Estimated TSF, Estimated Play-Back Delay, and PT from TX to determine whether the I2S clock rate (APLL) must be increased or decreased. In some embodiments, because the increment of the APLL's input and feedback divider ratios is discrete and with finite frequency steps, the APLL produces frequency tuning jitter as the APLL must 'hunt' around the desired I2S frequency.

In some embodiments, the I2S clock can be used by I2S DMA Engine 1212, I2S DAC 1226, and I2S ADC 1228. In some embodiments, I2S DMA Engine 1212 receives audio data from I2S ADC 1228. In some embodiments, I2S ADC 1228 receives analog audio and converts it to digital I2S data for the I2S DMA Engine 1212. In some embodiments, I2S ADC 1228 receives analog audio captured by a microphone. In some embodiments, I2S DMA Engine 1212 provide digital audio data to the I2S DAC 1226. In some embodiments, I2S DAC 1226 converts the digital audio data from I2S DMA Engine 1212 to analog audio. In some embodiments, the analog audio I2S DAC 1226 may be provided to an amplification system to amplify the analog audio. In some embodiments, the I2S DMA Engine 1212 provides the captured microphone data to the Capture Ring Buffer 1216. In some embodiments, the Capture Ring Buffer 1216 can make the capture microphone data available to the audio detect and capture parameters 1206.

Figure 13:
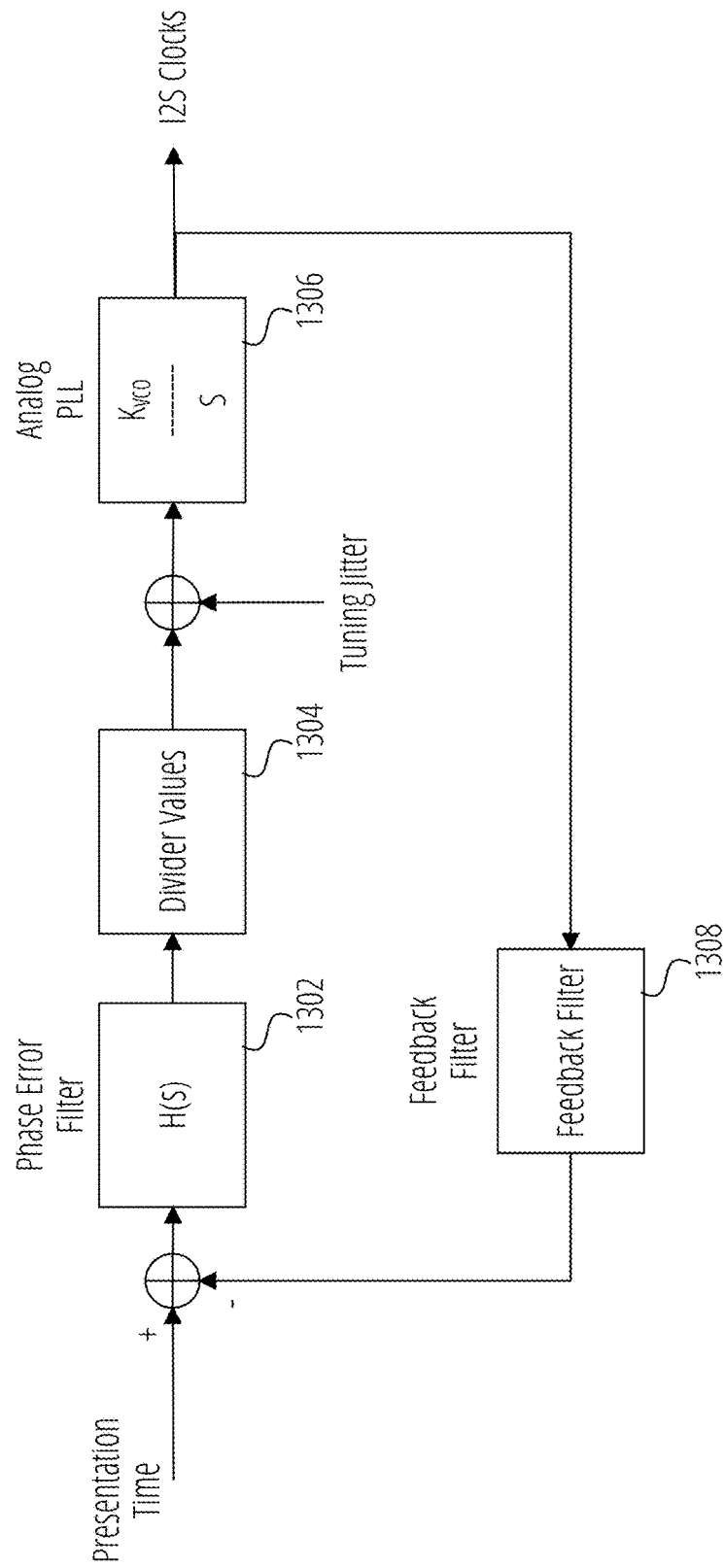
FIG. 13 is a block diagram illustrating a non-limiting model of an I2S Clock Generator according to some embodiments.

Turning now to FIG. 13, FIG. 13 illustrates a non-limiting model 1300 of an I2S Clock Generator 1232 according to some embodiments. In some embodiments, model 1300 generates an I2S clock. In some embodiments, model 1300 takes a Presentation Time as an input. In some embodiments, tuning jitter into Analog PLL 1306 is modeled as a noise input. In some embodiments, the noise input can be the difference between the continuous Phase Error Filter 1302 output (H(s)) and a discrete divider 1304 step. In some embodiments, Phase Error Filter 1302 and discrete divider 1304 can be available in APLL hardware. As will be noted, Phase Error Filter 1302, Feedback Filter 1308, and Analog PLL 1306 are represented as blocks with a Laplace Transform notation. In some embodiments, Phase Error Filter 1302 can implemented as adjustable filter 1400 as discussed in relation FIG. 14.

In some embodiments, Tuning Jitter noise can be minimized by having a low bandwidth System Gain determined by 1/FB(s) and a high bandwidth Loop Gain determined by H(s). In some embodiments, this approach can allow the loop to remove the APLL Tuning Jitter while filtering away the jitter in the Presentation Time estimated input. In some embodiments, this process can be a noise shaping process in a Sigma-Delta Digital to Analog converter.

FIG. 14 is a block diagram illustrating an adjustable filter 1400 according to some embodiments. In some embodiments, the adjustable filter 1400 can be referred to as a Phase Error filter.

In some embodiments, the adjustable filter can be configured based on a settling time. In some embodiments, the settling time can correspond to the adjustable filter 1400. In some embodiments, the settling time can correspond to a collection of components such as I2S Clock Generator 1232 discussed in relation to FIG. 12. In some embodiments, the collections of components may or may not include the adjustable filter 1400. In some embodiments, the settling time can correspond to a component other than the adjustable filter 1400 (e.g., APLL 1224 discussed in relation to FIG. 12). In some embodiments, a target or desired settling time can be obtained during a settling phase of a system (e.g., system 1200) including the adjustable filter 1400. In some embodiments, the settling phase can comprise a three stage process.

In some embodiments, in a first stage, the process can include settling a Timing Delay Error. In some embodiments, for the Settling time period between a first time or an input time datum and a second time a value of a parameter of adjustable filter 1400 (e.g., $K_a$, $K_b$, z, α, $K_f$) can be set with a predetermined value. For example, in some embodiments, the input time datum can be 0 and a second time can be 30 seconds. In some embodiments, the period between the first time and the second time can be referred to as a first time period (e.g., 0<time<30 seconds). Thus, in some embodiments, in the first time period, the $K_a$ coefficient can be set to 0. In some of those embodiments, the adjustable filter 1400 can be said to be a Type 1 loop filter. In some of those embodiments still, and the $K_b$ coefficient can be set for the fastest possible loop. In some embodiments, the A Accumulator can be preloaded with a stored Frequency Error value. In some embodiments, the stored Frequency Error value can be obtained from a previous settled state. In some embodiments, the stored Frequency Error value can be an arbitrary value. In some embodiments, the stored Frequency Error value can be within 4 parts per million (PPM) of the current PPM.

In some embodiments, in a second stage, the process can include settling a Frequency Error. In some embodiments, for the Settling time period between the second time and a third time the value of the parameter of adjustable filter 1400 can be set with a same or different predetermined value. In some embodiments, the settling time period between the second time and the third time (e.g., 3 minutes) can be referred to as a second time period. In the example above, the second time period can encompass 30 seconds≤time≤3 minutes, inclusive. In some embodiments, in the second time period, the $K_a$ and $K_b$ coefficients can each be set for the fastest possible Type 2 loop.

In some embodiments, in a third stage, the process can include a Tracking stage. In some embodiments, for the Settling time period after the third time (e.g., between the third time and a fourth time, where the fourth time is known or infinite), a third time period, the value of the parameter of adjustable filter 1400 can be set with a same or different predetermined value. In the example above, the third time period can be time >3 minutes. In some embodiments, in the third time period, the $K_a$ coefficient can set for the most damped (e.g., over-damped) Type 2 loop for optimum jitter performance. Table 2 illustrates non-limiting embodiments of experimental values for coefficients used in the Settling phase:

TABLE 2

| Base Fast Coefficients | Fast Coefficients with Freq Store |
|---|---|
| $K_a$ = [0.0240 0.0050] Switched at third time period (e.g., 3 minutes). | $K_a$ = [0.0000 0.0240 0.0050] Switched at second time period (e.g., 30 seconds) and at third time period (e.g., 3 minutes) |
| $K_b$ = 1 | $K_b$ = [1.5 1] Switched at second time period (e.g., 30 seconds) |
| $K_f$ = 2.778e−3 α = 4.167e−2 | $K_f$ = 2.778e−3 α = 4.167e−2 |

Table 3 illustrates non-limiting embodiments of experimental results for the Settling phase. The Fast Loop with Frequency Storage represents an implementation using the stored Frequency Error value (e.g., as illustrated in FIG. 14).

TABLE 3

| Parameter | Current Fast Loop | Fast Loop with Frequency Storage |
|---|---|---|
| Loop Bandwidth | 13.1 mHz | 13.1 mHz |
| −3 dB Bandwidth | 19.8 mHz | 19.8 mHz |
| Settling Time | 1 minute to 300 uSec 3 minutes to 40.6 uSec | 30 seconds to 75 uSec 3 minutes to 40.6 uSec |
| Max Delay Settling Error | 129 uSec | 1.3 uSec |
| Max Freq Settling Error | 370 uSec | 38.1 uSec |
| Peak Jitter over PPM | 2.98 uSec | 2.98 uSec |
| RMS Jitter Rejection | 13.8 times | 13.8 times |

FIGS. 17, 18, and 19, illustrate non-limiting embodiments of experimental results before and after coefficient switches. FIGS. 17A and 17B illustrate non-limiting embodiments of experimental results of an APLL closed loop frequency response (e.g., bandwidth) before a coefficient switch using the Base Fast Coefficient and the Fast Coefficients with Frequency Store, respectively. FIGS. 17C and 17D illustrate non-limiting embodiments of experimental results of the APLL closed loop frequency response (e.g., bandwidth) after the last coefficient switch using the Base Fast Coefficient and the Fast Coefficients with Frequency Store, respectively.

Figure 18A:
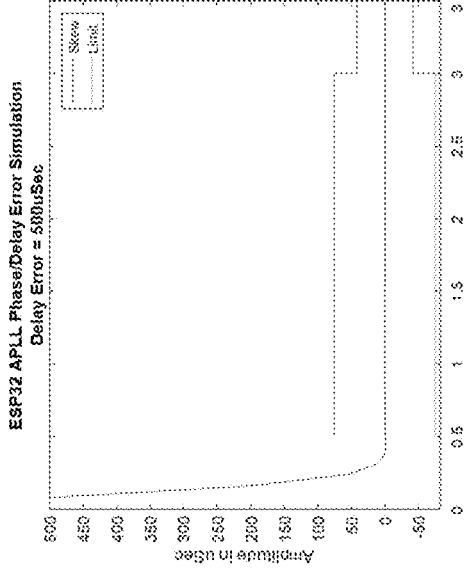
FIG. 18A illustrates non-limiting embodiments of experimental results of timing error settling time for an APLL according to some embodiments.
Figure 18B:
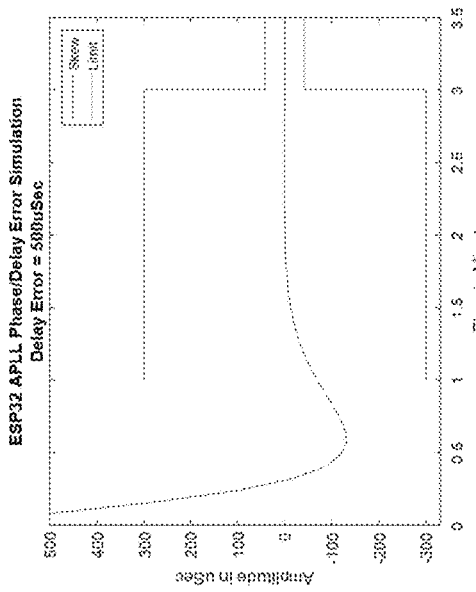
FIG. 18B illustrates non-limiting embodiments of experimental results of timing error settling time for an APLL according to some embodiments.
Figure 18C:
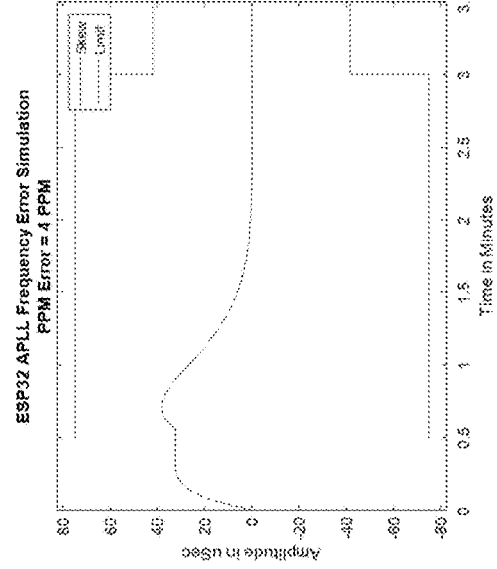
FIG. 18C illustrates non-limiting embodiments of experimental results of frequency error settling time for an APLL according to some embodiments.
Figure 18D:
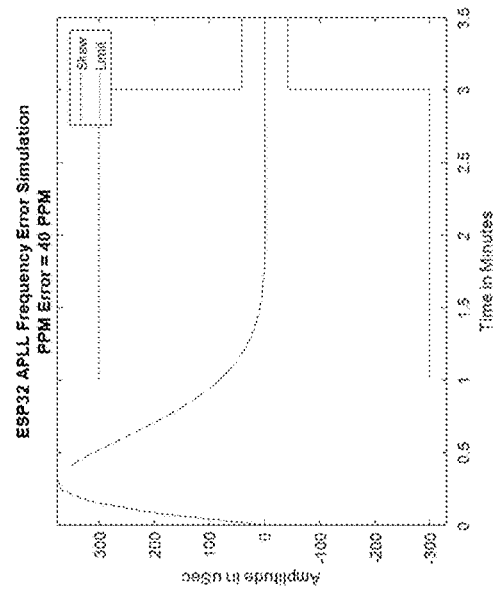
FIG. 18D illustrates non-limiting embodiments of experimental results of frequency error settling time for an APLL according to some embodiments.

FIGS. 18A and 18B illustrate non-limiting embodiments of experimental results of timing error settling time for an APLL using the Base Fast Coefficient and the Fast Coefficients with Frequency Store, respectively. FIGS. 18C and 18D illustrate non-limiting embodiments of experimental results of frequency error settling time for an APLL using the Base Fast Coefficient and the Fast Coefficients with Frequency Store, respectively.

Figure 19A:
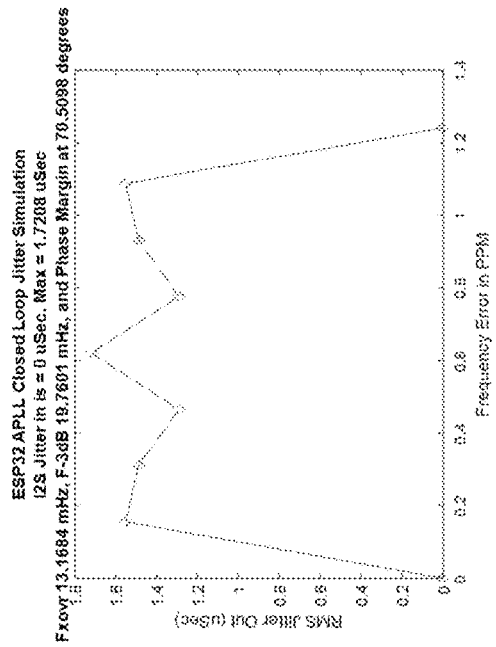
FIG. 19A illustrates non-limiting embodiments of experimental results of internal jitter reduction for an APLL according to some embodiments.
Figure 19C:
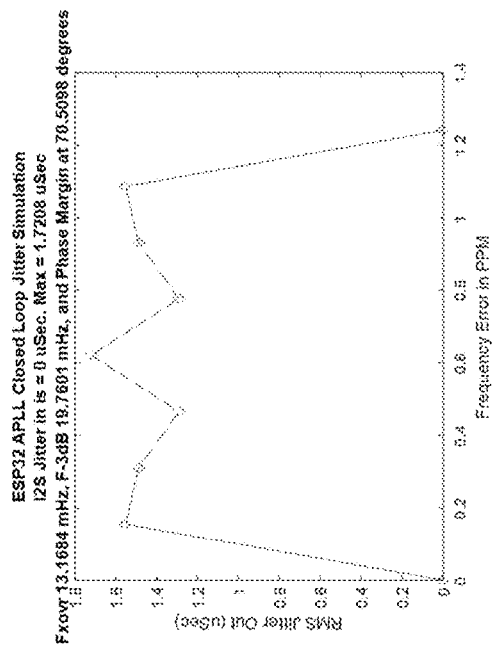
FIG. 19C illustrates non-limiting embodiments of experimental results of external jitter reduction for an APLL according to some embodiments.
Figure 19B:
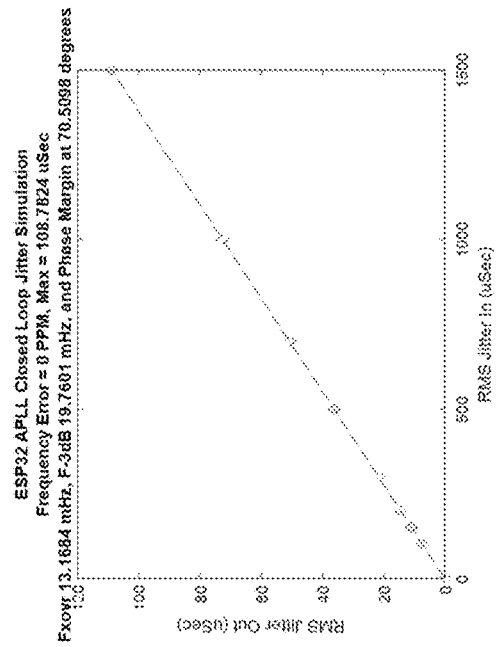
FIG. 19B illustrates non-limiting embodiments of experimental results of internal jitter reduction for an APLL according to some embodiments.
Figure 19D:
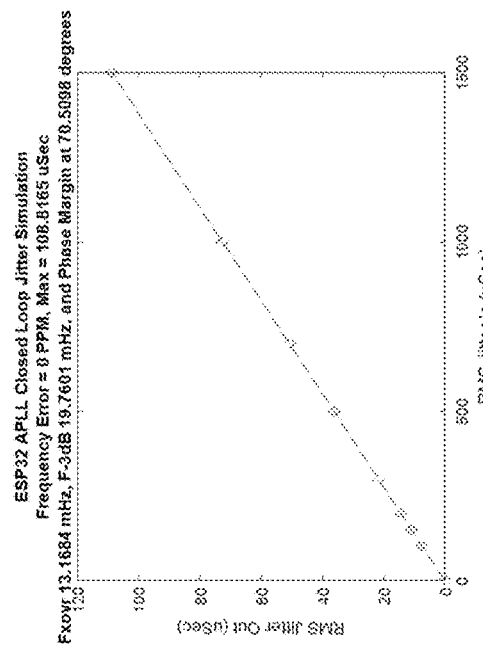
FIG. 19D illustrates non-limiting embodiments of experimental results of external jitter reduction for an APLL according to some embodiments.

FIGS. 19A and 19B illustrate non-limiting embodiments of experimental results of internal jitter reduction (e.g., voltage controlled oscillator (VCO) quantization) for an APLL using the Base Fast Coefficient and the Fast Coefficients with Frequency Store, respectively. FIGS. 19C and 19D illustrate non-limiting embodiments of experimental results of external jitter reduction for an APLL using the Base Fast Coefficient and the Fast Coefficients with Frequency Store, respectively.

Figure 15:
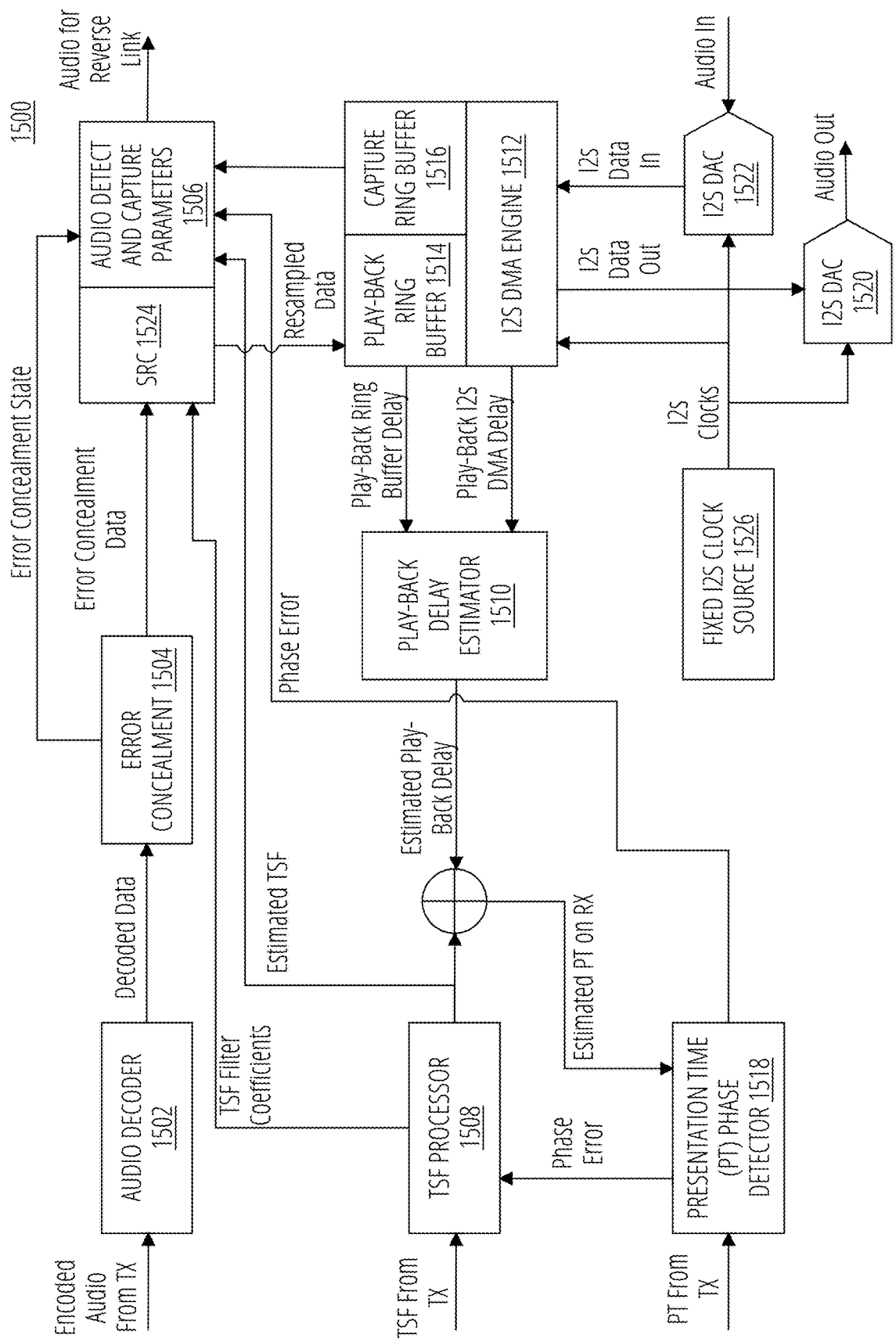
FIG. 15 is a block diagram illustrating a system including a Presentation Time Locked Loop for presentation of audio blocks according to some embodiments.

Returning to FIG. 15, FIG. 15 depicts a non-limiting example of system 1500 employing PTLL with a software-based Sample Rate Converter (SRC). As will be noted, system 1500 includes the same elements and process as system 1200, except where they differ. In some embodiments, system 1200 differs from system 1500 in that system 1500 can adjust the Audio (I2S) Data.

In some embodiments, system 1500 can adjust the Audio (I2S) Data by feeding the Phase Error from PT Phase Detector 1518 to the TSF processor 1508. Then, in some embodiments, PT Phase Detector 1518 can apply compensation in the form of TSF Filter Coefficients that can then be applied to the SRC 1524. As discussed in U.S. Pat. No. 10,1302,468, incorporated by reference herein, TSF Filter Coefficients can be determined by adjusting a frequency coefficient and a delay coefficient. In some embodiments, a frequency coefficient can track and audio clock frequency relationship between a TS and an RX. In some embodiments, a delay coefficient can track a time offset between a Presentation Time of the TX and the RX.

In some embodiments, the frequency coefficient and the delay coefficient can be adjusted separately or together. In some embodiments, these coefficient can be updated to improve the fit of the first order linear equation that translates the time at the TX to the time at the RX. In some embodiments, coarse adjustments can be achieved with the frequency coefficients first and then the fine adjustments can be achieved with the delay coefficient second. In some embodiments, these updated coefficients can be used to calculate an RX sample time for ab SRC's resampled data with respect to a TX's data sample time.

Turning now to FIG. 20, FIG. 20 is a schematic diagram illustrating an example embodiment of a device 2000 (e.g., a client device, a computing device) that may be used within the present disclosure. In some embodiments, device 2000 may be a source 202, a display 204, a TxSpeaker 206, a RxSpeaker 208, a RxSpeaker 210, or a combination thereof as described with respect to FIG. 2. The device 2000 is merely an illustrative example of a suitable computing environment and in no way limits the scope of the present disclosure. As used herein, a "device" or "computing device" can include a "workstation," a "server," a "laptop," a "desktop," a "hand-held device," a "mobile device," a "tablet computer," or other computing devices, as would be understood by those of skill in the art. Embodiments of the present disclosure may utilize any number of devices 2000 in any number of different ways to implement a single embodiment of the present disclosure. Accordingly, embodiments of the present disclosure are not limited to a single device 2000, as would be appreciated by one with skill in the art, nor are they limited to a single type of implementation or configuration of the example device 2000.

In some embodiments, device 2000 may include a bus 2002 that can be coupled to one or more of the following illustrative components, directly or indirectly: input/output (I/O) component 2004, I/O port 2006, one or more processors 2008, one or more memories 2010, one or more presentation components 2012, and power supply 2014. One of skill in the art will appreciate that the bus 2002 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices.

In some embodiments, device 2000 can include or interact with a variety of computer-readable media. For example, computer-readable media can include Random Access Memory (RAM), Read Only Memory (ROM), Electronically Erasable Programmable Read Only Memory (EEPROM), flash memory or other memory technologies, CD-ROM, digital versatile disks (DVD) or other optical or holographic media, and magnetic storage devices that can be used to encode information and can be accessed by the devices 2000.

In some embodiments, memory 2010 can include computer-storage media in the form of volatile and/or nonvolatile memory. In some embodiments, memory 2010 may be removable, non-removable, or any combination thereof. For example, in some embodiments, memory 2010 may be a hardware device such as hard drives, solid-state memory, optical-disc drives, and the like.

In some embodiments, device 2000 can include one or more processors that read data from components such as the memory 2010, the various I/O components 2004, etc. In some embodiments, presentation components 2012 present data indications to a user or other device. For example, in some embodiments, presentation components 2012 may include a display device, speaker, a printing component, a haptic component, etc.

In some embodiments, the I/O ports 2006 can enable the device 2000 to be logically coupled to other devices, such as I/O components 2004. In some embodiments, some of the I/O components 2004 can be built into the device 2000. In some embodiments, I/O component 2004 may be a microphone, joystick, recording device, game pad, satellite dish, scanner, printer, wireless device, networking device, and the like. In some embodiments, I/O port 2006 may utilize one or more communication technologies, such as USB, infrared, Bluetooth™, or the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present disclosure will be apparent to those skilled in the art in view of the foregoing description. Accordingly, this description is to be construed as illustrative only and is for the purpose of teaching those skilled in the art the best mode for carrying out the present disclosure. Details of the structure may vary substantially without departing from the spirit of the present disclosure, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the present disclosure. It is intended that the present disclosure be limited only to the extent required by the appended claims and the applicable rules of law.

It is also to be understood that the following claims are to cover all generic and specific features of the embodiments described herein, and all statements of the scope of the embodiments which, as a matter of language, might be said to fall therebetween. All the references cited herein are incorporated by reference.

What is claimed is:

1. A method comprising:
receiving an input time datum;
determining a time period from the input time datum to a second time, the second time occurring after the input time datum;
determining a value for at least one parameter of an adjustable filter based on the time period;
configuring the adjustable filter based on the value of the at least one parameter;
determining an output time datum by applying the configured adjustable filter to the input time datum; and
outputting the output time datum.

2. The method of claim 1, wherein the at least one parameters of the adjustable filter is selected from the group comprising coefficients and loads or presets for internal accumulators or integrators of the adjustable filter.

3. The method of claim 1, wherein the configured adjustable filter is a critically damped Type 1 loop filter and wherein the value of the at least one parameters corresponds to a previously settled loop state.

4. The method of claim 1, wherein the configured adjustable filter is a critically damped Type 2 loop filter.

5. The method of claim 1, wherein the configured adjustable filter is an over-damped Type 2 loop filter.

6. The method of claim 1, wherein the time period is a first time period and the configured adjustable filter is a critically damped Type 1 loop filter and wherein the value of the at least one parameter corresponds to a previously settled loop filter.

7. The method of claim 6, further comprising:
determining a second time period from the input time datum to a third time, the third time occurring after the second time;
determining a second value for the at least one parameter of the adjustable filter based on the second time period; and
reconfiguring the adjustable filter based on the second value of the at least one parameter, wherein the reconfigured adjustable filter is a critically damped Type 2 loop filter.

8. The method of claim 7, further comprising:
determining a third time period from the input time datum to a fourth time, the fourth time occurring after the third time;
determining a third value for the at least one parameter of the adjustable filter based on the third time period; and
reconfiguring the adjustable filter based on the third value of the at least one parameter, wherein the reconfigured adjustable filter is an over-damped Type 2 loop filter.

9. The method of claim 1, wherein the adjustable filter is a first adjustable filter and wherein determining the output time datum further comprises applying a second adjustable filter in a feedback path between the input and output of the first adjustable filter.

10. The method of claim 1, further comprising determining the value for the at least one parameter is based on amplitude limits of a difference between an input and an output of the adjustable filter.

11. A device comprising a processor configured to:
receive an input time datum;
determine a time period from the input time datum to a second time, the second time occurring after the input time datum;
determine a value for at least one parameter of an adjustable filter based on the time period;
configure the adjustable filter based on the value of the at least one parameter;
determine an output time datum by applying the configured adjustable filter to the input time datum; and
output the output time datum.

12. The device of claim 11, wherein the at least one parameters of the adjustable filter is selected from the group comprising coefficients and loads or presets for internal accumulators or integrators of the adjustable filter.

13. The device of claim 11, wherein the configured adjustable filter is a critically damped Type 1 loop filter and wherein the value of the at least one parameters corresponds to a previously settled loop state.

14. The device of claim 11, wherein the configured adjustable filter is a critically damped Type 2 loop filter.

15. The device of claim 11, wherein the configured adjustable filter is an over-damped Type 2 loop filter.

16. The device of claim 11, wherein the time period is a first time period and the configured adjustable filter is a critically damped Type 1 loop filter and wherein the value of the at least one parameter corresponds to a previously settled loop filter.

17. The device of claim 16, the processor further configured to:
determine a second time period from the input time datum to a third time, the third time occurring after the second time;
determine a second value for the at least one parameter of the adjustable filter based on the second time period; and
reconfigure the adjustable filter based on the second value of the at least one parameter, wherein the reconfigured adjustable filter is a critically damped Type 2 loop filter.

18. The device of claim 17, the processor further configured to:
determine a third time period from the input time datum to a fourth time, the fourth time occurring after the third time;
determine a third value for the at least one parameter of the adjustable filter based on the third time period; and
reconfigure the adjustable filter based on the third value of the at least one parameter, wherein the reconfigured adjustable filter is an over-damped Type 2 loop filter.

19. The device of claim 11, wherein the adjustable filter is a first adjustable filter and wherein determining the output time datum further comprises applying a second adjustable filter in a feedback path between the input and output of the first adjustable filter.

20. The device of claim 11, the processor further configured to determine the value for the at least one parameter is based on amplitude limits of a difference between an input and an output of the adjustable filter.

* * * * *